US008265463B2

(12) United States Patent
Kohno

(10) Patent No.: US 8,265,463 B2
(45) Date of Patent: Sep. 11, 2012

(54) INFORMATION PROCESSING APPARATUS, METHOD FOR THE SAME AND INFORMATION GATHERING SYSTEM

(75) Inventor: Akihiro Kohno, Shinagawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1458 days.

(21) Appl. No.: 11/457,186

(22) Filed: Jul. 13, 2006

(65) Prior Publication Data
US 2007/0014539 A1 Jan. 18, 2007

(30) Foreign Application Priority Data

Jul. 14, 2005 (JP) ................................ 2005-206131

(51) Int. Cl.
H04N 5/928 (2006.01)
H04N 5/76 (2006.01)
H04N 5/84 (2006.01)
H04N 5/93 (2006.01)
H04N 5/765 (2006.01)
H04N 7/10 (2006.01)
H04N 7/16 (2006.01)
H04N 7/173 (2006.01)
G06F 17/00 (2006.01)
G10L 21/00 (2006.01)
G11B 21/12 (2006.01)

(52) U.S. Cl. ........ 386/338; 386/200; 386/282; 386/284; 386/285; 386/293; 386/334; 369/25.01; 700/94; 704/272; 725/32; 725/87; 725/134; 725/142

(58) Field of Classification Search .................... 386/96, 386/46, 83, 125, E5.001, E5.034, 282, 284, 386/285; 369/25.01; 375/E7.271; 700/94; 704/272; 348/E5.099, E7.071; 707/999.2, 707/E17.013, E17.028; 725/32, 87, 134, 725/142
See application file for complete search history.

(56) References Cited

U.S. PATENT DOCUMENTS 7,212,873 B1 * 5/2007 Townsend et al. .............. 700/94
7,379,661 B2 * 5/2008 Lamkin et al. ................ 386/248
(Continued)

FOREIGN PATENT DOCUMENTS

GB 2225147 A * 5/1990
(Continued)

OTHER PUBLICATIONS

The above Japanese patent document was cited in a Feb. 7, 2011 Japanese Office Action, which is enclosed without an English Translation, that issued in Japanese Patent Application No. 2005-206131.

Primary Examiner — Thai Tran
Assistant Examiner — Syed Hasan
(74) Attorney, Agent, or Firm — Cowan, Liebowitz & Latman, P.C.

(57) ABSTRACT

Video data and audio data corresponding to a predetermined attribute is retrieved from the video data and the audio data, each of which is stored in association with an attribute, and the retrieved items of the video data and the audio data are listed in a form showing a correlation between the video data and the audio data. In a case that items of the video data and audio data are selected, wherein said items of the video data and audio data are displayed and correlated with each other, the selected video data and audio data can be synchronized with each other and played-back.

22 Claims, 27 Drawing Sheets

U.S. PATENT DOCUMENTS

| | | | |
|---|---|---|---|
| 2002/0059322 A1* | 5/2002 | Miyazaki et al. | 707/200 |
| 2002/0087974 A1* | 7/2002 | Sprague | 725/32 |
| 2003/0131362 A1* | 7/2003 | Jasinschi et al. | 725/134 |
| 2006/0204214 A1* | 9/2006 | Shah et al. | 386/54 |

FOREIGN PATENT DOCUMENTS

| | | |
|---|---|---|
| JP | 10-136347 | 5/1998 |
| JP | 2001-184397 A | 6/2001 |
| JP | 2002-262148 | 9/2002 |

* cited by examiner

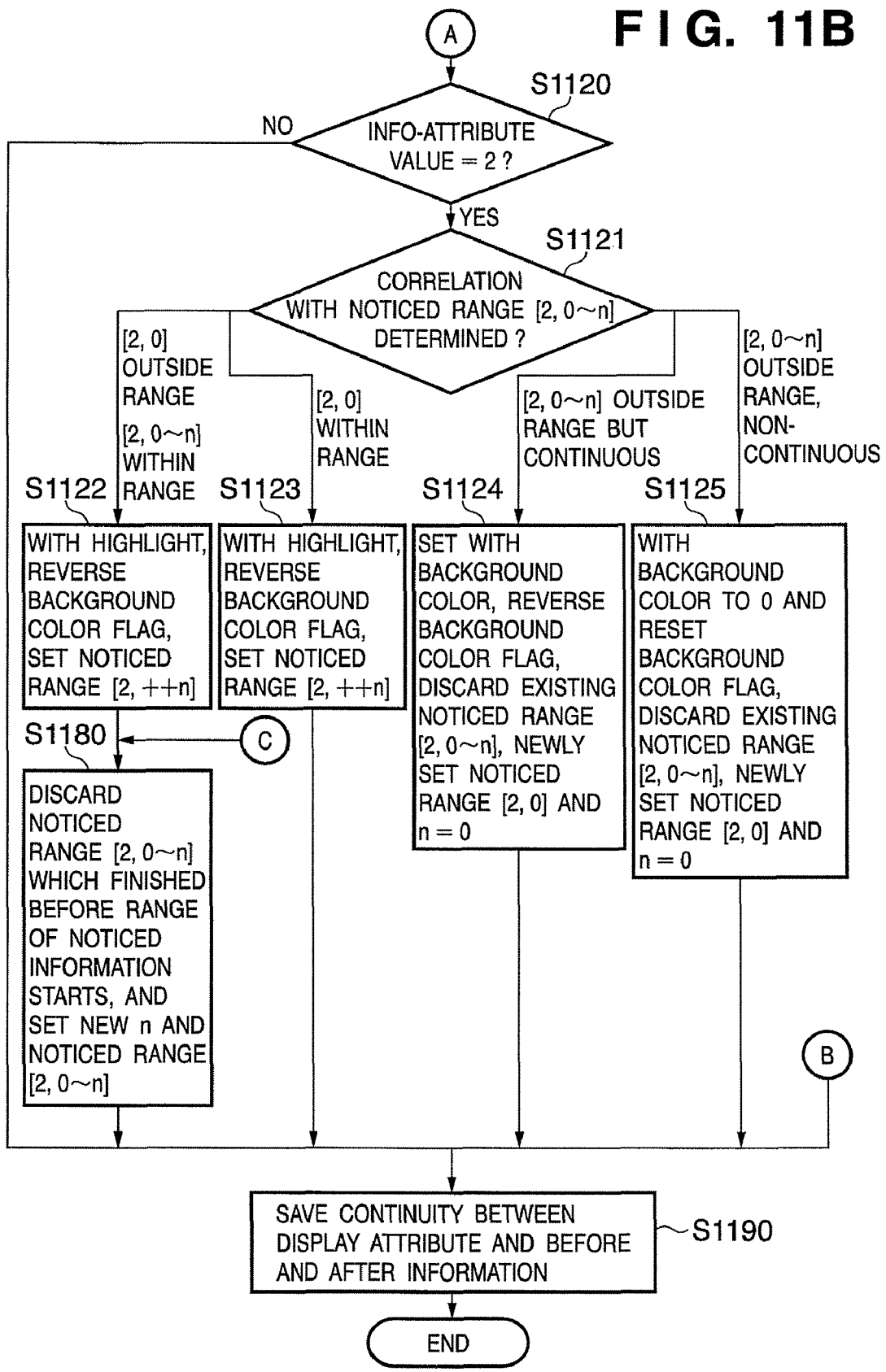

F I G. 12
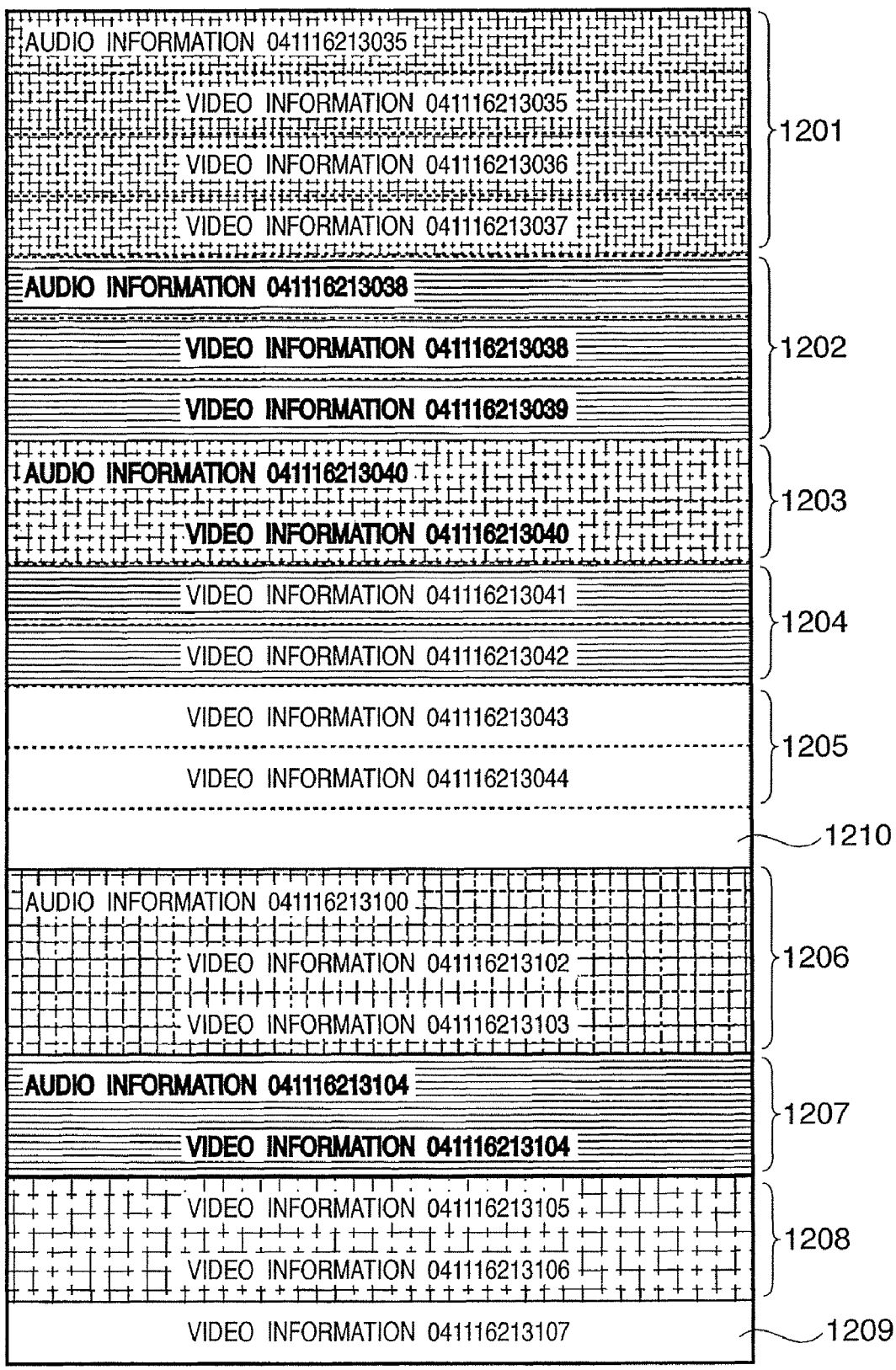

F I G. 18
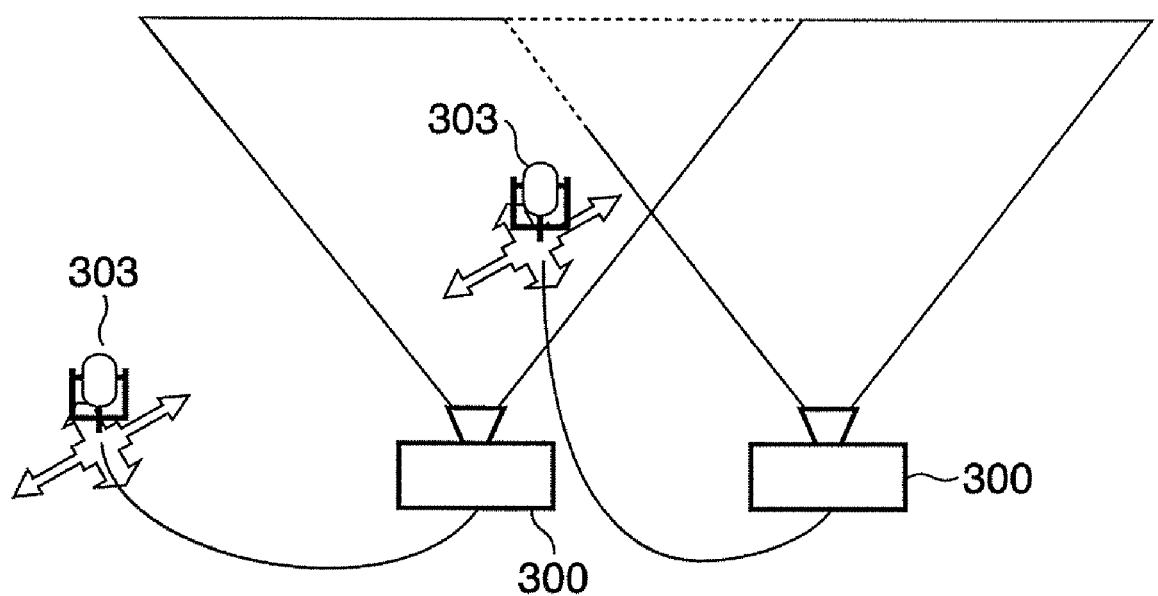

FIG. 20

AUDIO INFORMATION 041116213035
VIDEO INFORMATION 041116213035
VIDEO INFORMATION 041116213036
VIDEO INFORMATION 041116213037
VIDEO INFORMATION 041116213038
VIDEO INFORMATION 041116213039
} 19000

AUDIO INFORMATION 041116213040
VIDEO INFORMATION 041116213040
VIDEO INFORMATION 041116213041
VIDEO INFORMATION 041116213042
VIDEO INFORMATION 041116213043
VIDEO INFORMATION 041116213044

AUDIO INFORMATION 041116213100
VIDEO INFORMATION 041116213102
VIDEO INFORMATION 041116213103
VIDEO INFORMATION 041116213104
VIDEO INFORMATION 041116213105
VIDEO INFORMATION 041116213106
VIDEO INFORMATION 041116213107
AUDIO INFORMATION 041116213108
VIDEO INFORMATION 041116213108
VIDEO INFORMATION 041116213109
VIDEO INFORMATION 041116213110

| | |
|---|---|
| AUDIO INFORMATION 041116213035 | YELLOW |
| VIDEO INFORMATION 041116213035 | YELLOW |
| VIDEO INFORMATION 041116213036 | YELLOW |
| VIDEO INFORMATION 041116213037 | YELLOW |
| VIDEO INFORMATION 041116213038 | YELLOW |
| VIDEO INFORMATION 041116213039 | YELLOW |
| AUDIO INFORMATION 041116213040 | BLUE |
| VIDEO INFORMATION 041116213040 | BLUE |
| VIDEO INFORMATION 041116213041 | BLUE |
| VIDEO INFORMATION 041116213042 | BLUE |
| VIDEO INFORMATION 041116213043 | NONE |
| VIDEO INFORMATION 041116213044 | NONE |
| | |
| AUDIO INFORMATION 041116213100 | YELLOW |
| VIDEO INFORMATION 041116213102 | YELLOW |
| VIDEO INFORMATION 041116213103 | YELLOW |
| VIDEO INFORMATION 041116213104 | YELLOW |
| VIDEO INFORMATION 041116213105 | NONE |
| VIDEO INFORMATION 041116213106 | NONE |
| VIDEO INFORMATION 041116213107 | NONE |
| AUDIO INFORMATION 041116213108 | YELLOW |
| VIDEO INFORMATION 041116213108 | YELLOW |
| VIDEO INFORMATION 041116213109 | YELLOW |
| VIDEO INFORMATION 041116213110 | YELLOW |

19000 (rows from 041116213035 to 041116213039)

FIG. 22

| AUDIO INFORMATION 041116213035 |
| VIDEO INFORMATION 041116213035 |
| VIDEO INFORMATION 041116213036 |
| VIDEO INFORMATION 041116213037 |
| AUDIO INFORMATION 041116213038 |
| VIDEO INFORMATION 041116213038 |
| VIDEO INFORMATION 041116213039 |
| AUDIO INFORMATION 041116213040 |
| VIDEO INFORMATION 041116213040 |
| VIDEO INFORMATION 041116213041 |
| VIDEO INFORMATION 041116213042 |
| VIDEO INFORMATION 041116213043 |
| VIDEO INFORMATION 041116213044 |
| AUDIO INFORMATION 041116213100 |
| VIDEO INFORMATION 041116213102 |
| VIDEO INFORMATION 041116213103 |
| AUDIO INFORMATION 041116213104 |
| VIDEO INFORMATION 041116213104 |
| VIDEO INFORMATION 041116213105 |
| VIDEO INFORMATION 041116213106 |
| VIDEO INFORMATION 041116213107 |

FIG. 23

| VIDEO INFORMATION 041116213038 | | | |
|---|---|---|---|
| AUDIO INFORMATION | 041116213035 | ~ | 041116213039 |
| AUDIO INFORMATION | 041116213038 | ~ | 041116213040 |

| | | | |
|---|---|---|---|
| AUDIO INFORMATION 041116213035 | 041116213035 ~ | 041116213039 | YELLOW |
| VIDEO INFORMATION 041116213035 | 041116213035 | | YELLOW |
| VIDEO INFORMATION 041116213036 | 041116213036 | | YELLOW |
| VIDEO INFORMATION 041116213037 | 041116213037 | | YELLOW |
| AUDIO INFORMATION 041116213038 | 041116213038 ~ | 041116213040 | BLUE, HIGH LIGHT |
| VIDEO INFORMATION 041116213038 | 041116213038 | | BLUE, HIGH LIGHT |
| VIDEO INFORMATION 041116213039 | 041116213039 | | BLUE, HIGH LIGHT |
| AUDIO INFORMATION 041116213040 | 041116213040 ~ | 041116213042 | YELLOW, HIGH LIGHT |
| VIDEO INFORMATION 041116213040 | 041116213040 | | YELLOW, HIGH LIGHT |
| VIDEO INFORMATION 041116213041 | 041116213041 | | BLUE |
| VIDEO INFORMATION 041116213042 | 041116213042 | | BLUE |
| VIDEO INFORMATION 041116213043 | 041116213043 | | NONE |
| VIDEO INFORMATION 041116213044 | 041116213044 | | NONE |
| | | | |
| AUDIO INFORMATION 041116213100 | 041116213100 ~ | 041116213104 | YELLOW |
| VIDEO INFORMATION 041116213102 | 041116213102 | | YELLOW |
| VIDEO INFORMATION 041116213103 | 041116213103 | | YELLOW |
| AUDIO INFORMATION 041116213104 | 041116213104 ~ | 041116213106 | BLUE, HIGH LIGHT |
| VIDEO INFORMATION 041116213104 | 041116213104 | | BLUE, HIGH LIGHT |
| VIDEO INFORMATION 041116213105 | 041116213105 | | YELLOW |
| VIDEO INFORMATION 041116213106 | 041116213106 | | YELLOW |
| AUDIO INFORMATION 041116213107 | 041116213107 | | NONE |

INFORMATION PROCESSING APPARATUS, METHOD FOR THE SAME AND INFORMATION GATHERING SYSTEM

BACKGROUND OF THE INVENTION

Field of the Invention

The present invention relates to information processing apparatus, a control method for the same, and an information gathering system which can gather a plurality of items of stored information and specify coordination between them.

DESCRIPTION OF THE RELATED ART

As it is shown in the recent authoring tools, a plurality of items of video and audio information has been treated, edited and played-back at the same time. As it is shown in examples of streaming technology, it has become general that video and audio are synchronized with each other and played-back. Also, when the video and audio are recorded, they can be recorded in a way to make them easily synchronized and played-back.

A network camera server for connecting a camera with a panhead to a network, and distributing, for example, video of a concert or the like shot by the camera via networks has been used. Such a system enables a person to view video at a remote location by operating a camera (Japanese Patent Laid-Open No. 10-136347). Such a network camera system has been more and more demanded as a monitoring system for monitoring a building or a place, as the number of crimes has been increasing recently. If the camera system is used for such a purpose, a function of storing information on detecting an abnormal condition by a detecting signal or the like from the captured video or various types of sensor are needed (Japanese Patent Laid-Open No. 2002-262148).

If a monitoring system having a network camera which enables remote control via a network detects ignition by a sensor, for example, it can be considered to record audio for a predetermined time period or record video from the camera according to detection by another motion sensor. It is not necessarily specified to a user who is to use them what kind of information is stored and how the information can be used.

In order to achieve such an object, it is important to specify which items of information can be synchronized with each other among a plurality of items of information.

SUMMARY OF THE INVENTION

The present invention intends to solve the object of the above-mentioned conventional arts.

The features of the present invention enable a user to select preferred stored information by specifying correlation between ranges of respective types of information when it synchronizes a plurality of items of independently stored information with each other and displays/plays-back them.

According to the present invention, there is provided with an information processing apparatus comprising:

a video storage unit configured to store video data and attribute of the video data;

an audio storage unit configured to store audio data and attribute of the audio data;

a control unit configured to retrieve video data and audio data corresponding to a predetermined attribute from the video data stored in the video storage unit and the audio data stored in the audio storage unit, and to listen items of the retrieved video data and the audio data in a form showing correlation between the video data and the audio data on a display unit.

Further, according to the present invention, there is provided with an information processing method comprising:

a video-audio gathering step of retrieving video data and audio data corresponding to an attribute of predetermined event data from the video data and the audio data, each of which is stored in association with attribute;

a list display step of listing items of the video data and the audio data retrieved in the video-audio gathering step in a form showing correlation between the video data and the audio data; and a playback step of playing back the selected video data and audio data synchronized with each other, in a case where items of the video data and audio data are selected, wherein the items of the video data and audio data are displayed in the list display step and correlated with each other.

The features of the invention are achieved by a combination of the features set forth in the independent claims, while the dependent claims define specific advantageous examples of the invention.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A and 11B are flowcharts for illustrating process of a correlation display program executed in the information processing apparatus in the second embodiment of the present invention;

FIG. 12 is a diagram showing an exemplary list display according to the second embodiment;

FIG. 18 is a diagram for illustrating a space of a range attribute of the third embodiment;

FIG. 20 is a diagram showing an exemplary list display according to the seventh embodiment;

FIG. 21 is a diagram for illustrating background meta-information according to the seventh embodiment;

FIG. 22 is a diagram for illustrating an example of selecting from the list display according to the eighth embodiment of the present invention;

FIG. 23 is a diagram showing an example of displaying a candidate menu of a group of information to be selected of the eighth embodiment;

FIG. 24 is a diagram showing an example of background meta-information according to the eighth embodiment;

DESCRIPTION OF THE EMBODIMENTS

Preferred embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

Figure 1:
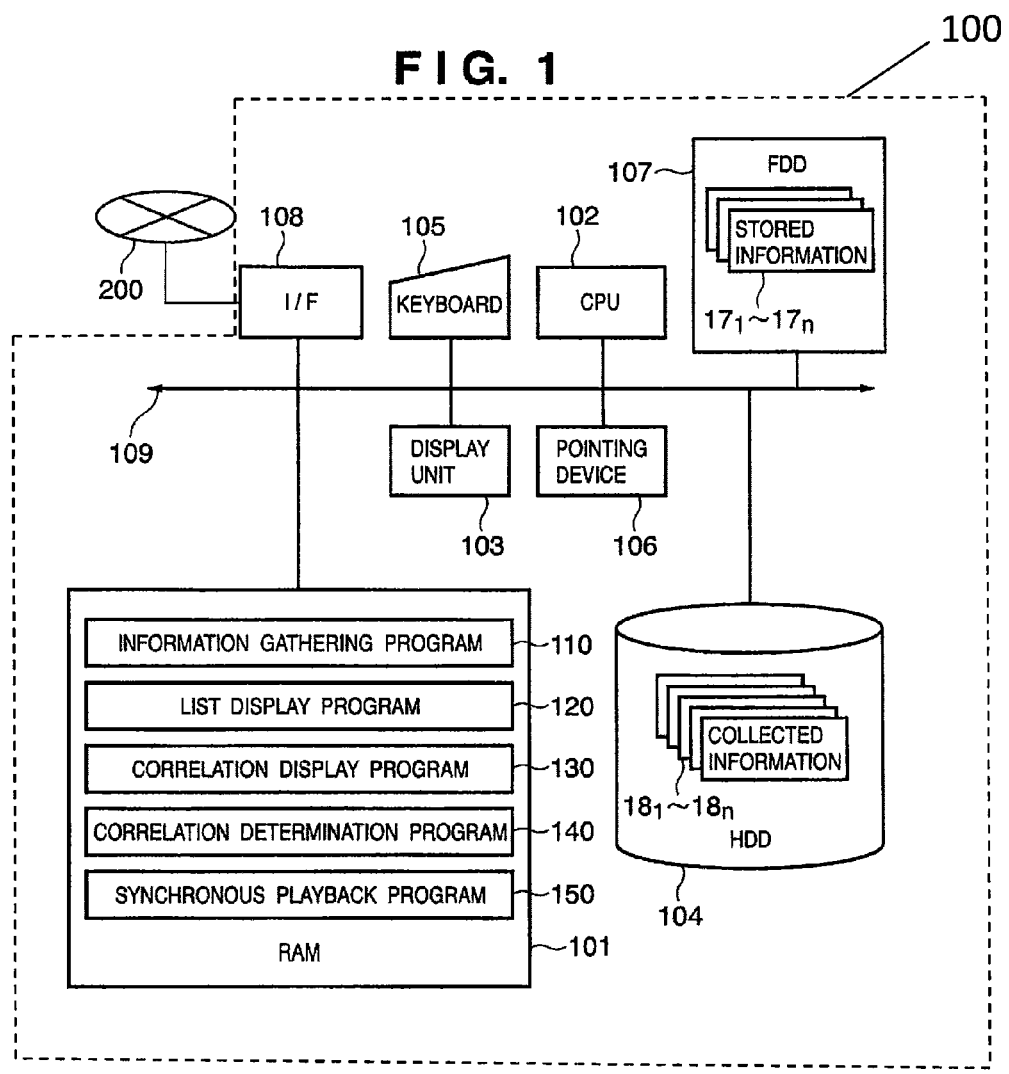
FIG. 1 is a block diagram for illustrating a configuration of information processing apparatus 100 according to an embodiment of the present invention. The information processing apparatus 100 is connected with a network 200 such as the Internet via a network interface (I/F) 108. The information processing apparatus 100 comprises a computer.

FIG. 1 is a block diagram for illustrating a configuration of information processing apparatus 100 according to an embodiment of the present invention. The information processing apparatus 100 is connected with a network 200 such as the Internet via a network interface (I/F) 108. The information processing apparatus 100 comprises a computer.

A memory (RAM) 101 stores various programs to be executed by a CPU 102 and provides a work area for temporally saving various types of data in controlling processing by the CPU 102. The CPU 102 executes various types of controlling operation according to a program loaded in the RAM 101. A display unit 103 displays various types of data, messages and the like. A keyboard 105 or a pointing device (mouse or the like) 106 is operated by a user and used for inputting a command or data into the apparatus. In an external storage unit (hard disk) 104, various programs, an OS and the like are installed. When executing of the programs are instructed, the programs are loaded into the RAM 101 and executed. In the HDD 104, a group of collected information items $18_1$-$18_n$, in which audio, video and the like are gathered, is stored. An FDD (floppy disk drive) is provided as a removable storage unit 107 and stores stored information items $17_1$-$17_n$. Audio is assumed to include all the generated audio instead of including only human voice.

In the RAM 101, an information gathering program 110, a list display program 120, a correlation display program 130, a correlation determination program 140, and a synchronous playback program 150 are stored. The programs will be described in detail later.

[First Embodiment]

Figure 2:
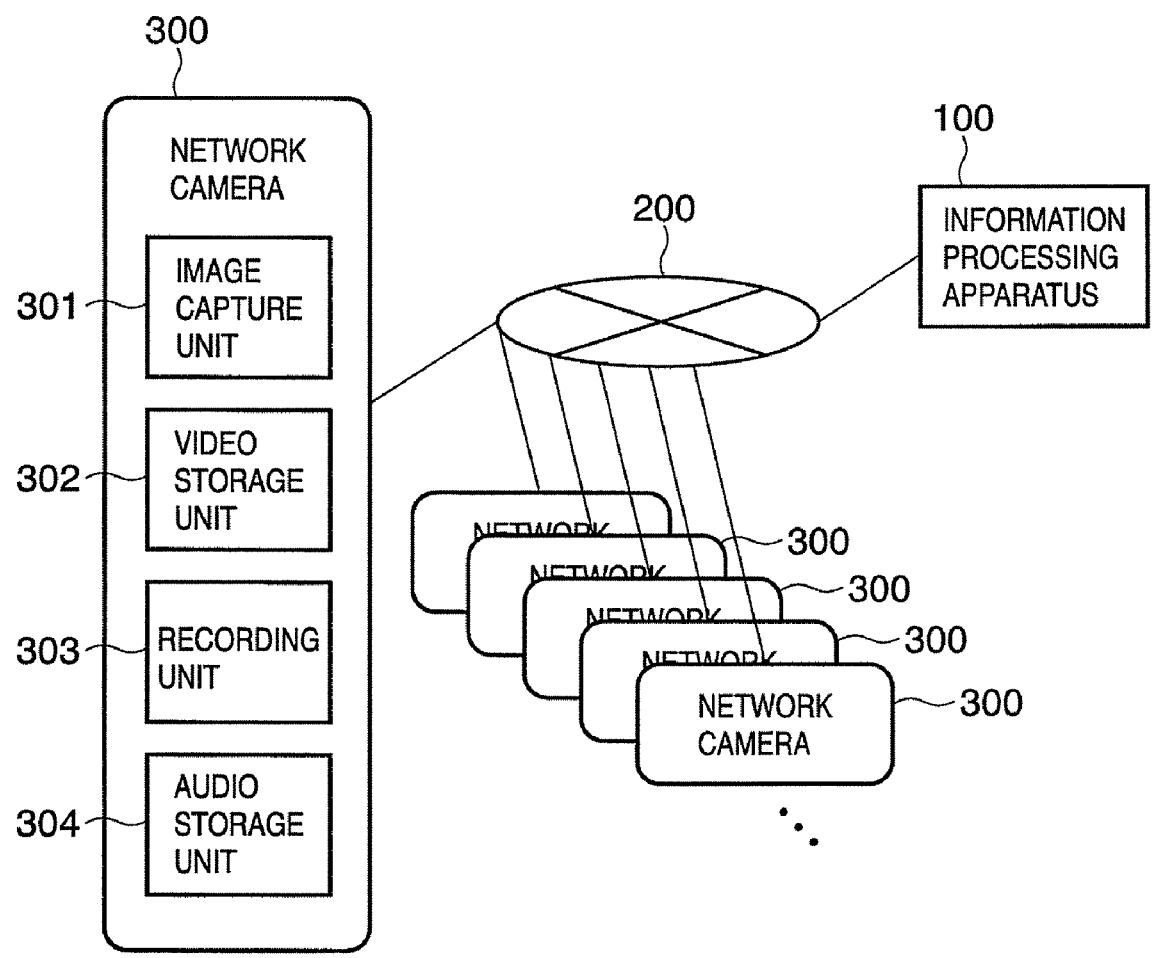
FIG. 2 is a diagram showing an entire configuration of the system according to the first embodiment.

FIG. 2 is a diagram showing an entire configuration of the system according to the first embodiment. In FIG. 2, an information processing apparatus 100 indicates the information processing apparatus shown in FIG. 1. Although a plurality of cameras 300 are connected in FIG. 2, an embodiment for processing an image from a single camera (network camera) 300 connected with a network 200 will be described in the first embodiment.

Each network camera 300 can be subject to remote control via the network 200. An image captured by the camera is distributed via the network 200. Each network camera 300 has an image capture unit 301 for capturing an image, a video storage unit 302 for saving image data captured by the image capture unit 301, a recording unit 303 for recording audio, and an audio storage unit 304 for saving audio (audio information) recorded by the recording unit 303. The video storage unit 302 is not a necessary component here and an image may be directly sent to the information processing apparatus 100 by conventional stream distribution or the like and stored in the apparatus 100. The audio storage unit 304 is not a necessary component, and audio may be directly sent to the information processing apparatus 100 by conventional stream distribution or the like and stored in the apparatus 100. The network 200 is not a necessary, and video saved in the video storage unit 302 may be carried on a transportable medium and passed from a transportable secondary storage unit 107 of the information processing apparatus 100. Stored information items $17_1$-$17_n$ stored in the video storage unit 302 or the audio storage unit 304, or the secondary storage unit 107 includes video data or audio data, and attribute information such as attributes of the data such as a shooting (imaging) time of day or a shooting (recording) time period, and an image-captured position. The attribute information does not necessarily need to include information intended for synchronization and may be stored as totally independent information.

Operation of a system according to the first embodiment will be described in detail.

Figure 3:
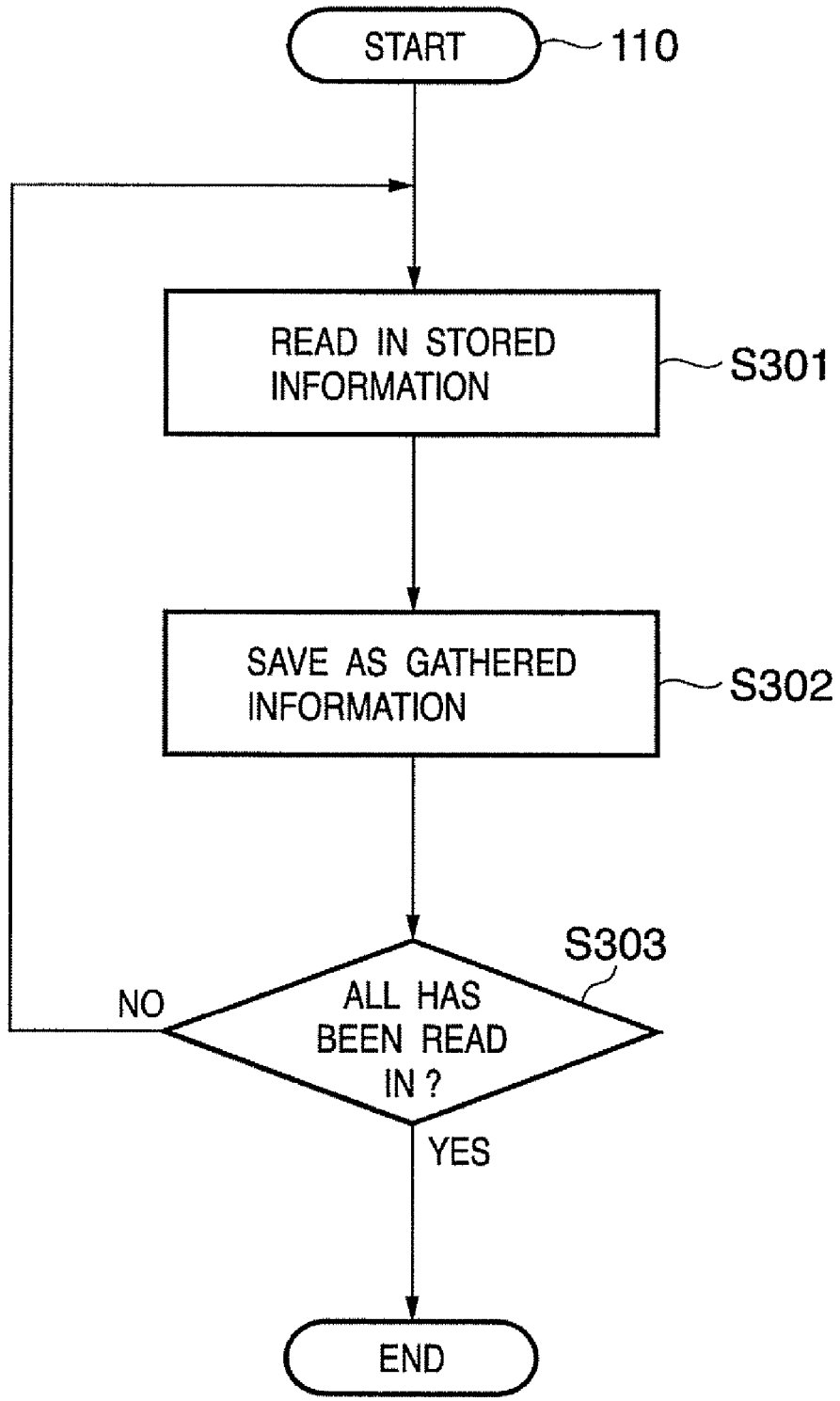
FIG. 3 is a flowchart for illustrating information gathering process by an information gathering program executed in the information processing apparatus according to the first embodiment.

FIG. 3 is a flowchart for illustrating information gathering process by an information gathering program 110 executed in the information processing apparatus 100 according to the first embodiment. First, definition of terms will be described. The term "objective information" refers to stored information to be listed which is imaged or recorded in a time period designated by a user. The term "noticed information" refers to a currently noticed item of information in the objective information.

First at step S301, stored information is read in. The stored information is read from the secondary storage unit 107, or the video storage unit 302 of the network camera 300 via the network 200, and the audio storage unit 304. Specifically, stored information items $17_1$-$17_n$ from the secondary storage unit 107 are read out and obtained. Alternatively, stored information is read in from the video storage unit 302 or the audio storage unit 304 of the network camera 300 by a network program such as an FTP transfer or an HTTP distribution. Alternatively, video data or audio information directly distributed from the image capture unit 301 or the recording unit 303 via the network 200 may be gathered as stream data and read in.

At step S302, information items read in at step S301 are classified into stored information items 18a-18$_n$ in association with each network camera 300 and saved in the HDD 104. An example of a configuration of the stored information items 18$_1$-18$_n$ can be realized by a folder considered as a folder for the stored information item 181 for saving a collection of corresponding video files or audio files. In the first embodiment, the stored information items 18$_1$-18$_n$ are assumed to be saved in the order in which information is gathered.

At step S303, it is determined whether all the stored information items to be processed have been read in or not, and from the step S301 to the step S303 are repeated until all items have been read in. When all the stored information items have been read in, the processing is ended.

Figure 4:
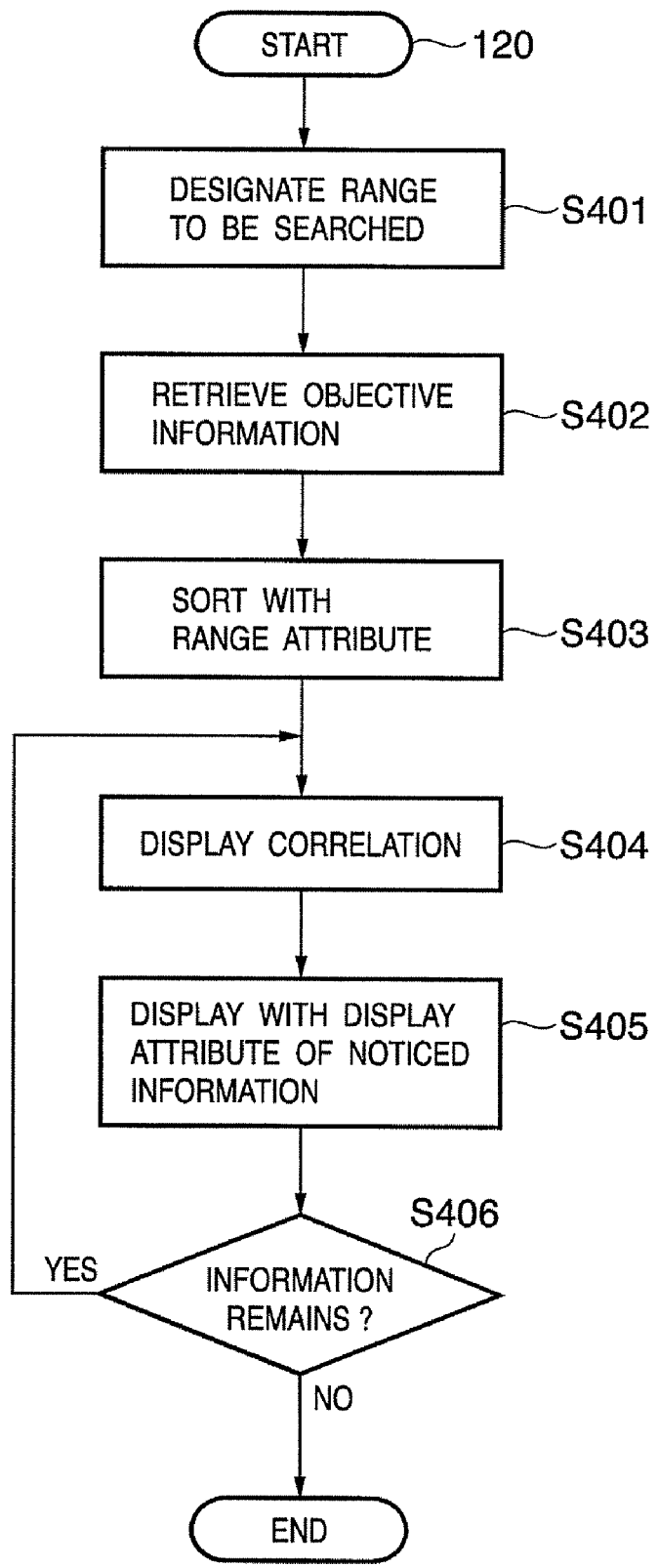
FIG. 4 is a flowchart for illustrating list display process by a list display program executed in the information processing apparatus according to the first embodiment.

FIG. 4 is a flowchart for illustrating list display process by the list display program 120 executed in the information processing apparatus 100 according to the embodiment.

At step S401, a range to be searched for video to be searched or audio information is designated. In the first embodiment, the range to be searched is designated by a time period, with time of day information saved as attribute information of video information or audio information used. For example, it is assumed that a user designated a time period from "21:30:35 in Nov. 16$^{th}$, 2004" to "21:31:10 in Nov. 16$^{th}$, 2004" is detected. At step S402, stored information items (objective information) corresponding to the time period (the range to be searched) designated at step S401 in stored information items 18$_1$-18$_n$ which are stored in the HDD 104 are retrieved. At step S403, the objective information items retrieved at step S402 are sorted based on a time attribute. In the first embodiment, the objective information items are sorted in reverse chronological order for the shooting (recording) start time of day, which is a time attribute. At step S 404, the objective information items are displayed in reverse chronological order for the shooting start time of day.

As recording start time of day of audio information is considered as a reference in the first embodiment, if the times of day are the same, audio information which is identified by "2" of an info-attribute to be described later comes first. A time of day attribute (start time of day) is realized by UTC or the like, for example, with the GMT (Greenwich Mean Time) or the like being coherently used for it. That makes a time of day coherently dealt with even between a plurality of items 18$_1$-18$_n$ of stored information and a plurality of network cameras 300.

At step S404, the correlation display program 130 is started, a display attribute (to be described later) of an item of noticed information (hereinafter, noticed information) is determined in an objective information item, and displayed on the display unit 103 at step S405. If it is determined that it has no continuity to the previous noticed information item at step S404, the noticed information item is displayed after a blank line or a break line, for example, is specified to specify non-continuity.

Processing from step S404 to step S405 is repeatedly executed until all the objective information item are displayed. When all items of the objective information are displayed at step S406, the list display program 120 is ended.

Figure 5:
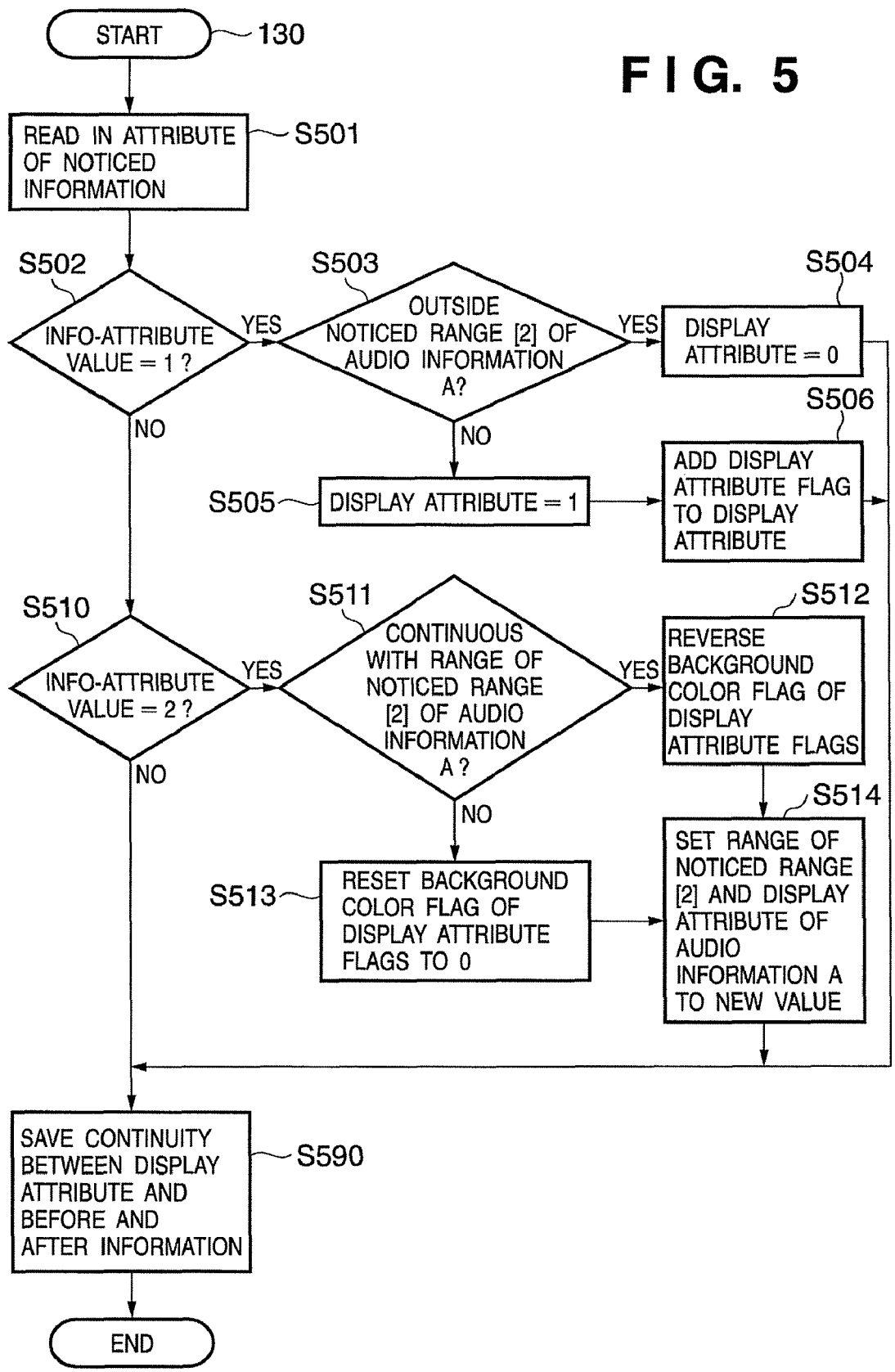
FIG. 5 is a flowchart for illustrating process by a correlation display program executed in the information processing apparatus according to the first embodiment.

FIG. 5 is a flowchart for illustrating process by the correlation display program 130 executed in the information processing apparatus 100 according to the first embodiment. In the flowchart, it is assumed that relevance between audio information A and noticed information is determined and display processing is executed.

In the first embodiment, an info-attribute is "1" when noticed information is video information, and an info-attribute is "2" when it is audio information. The range attribute is a time period defined by a shooting start time of day (or recording start time of day to input audio) and a shooting end time of day (or recording end time of day to input audio) of the objective information. Here, a range attribute of noticed information identified by the info-attribute "1" (video) is a noticed range [1], and a range attribute of noticed information identified by the info-attribute "2" (audio) is represented as a noticed range [2].

Figure 8:
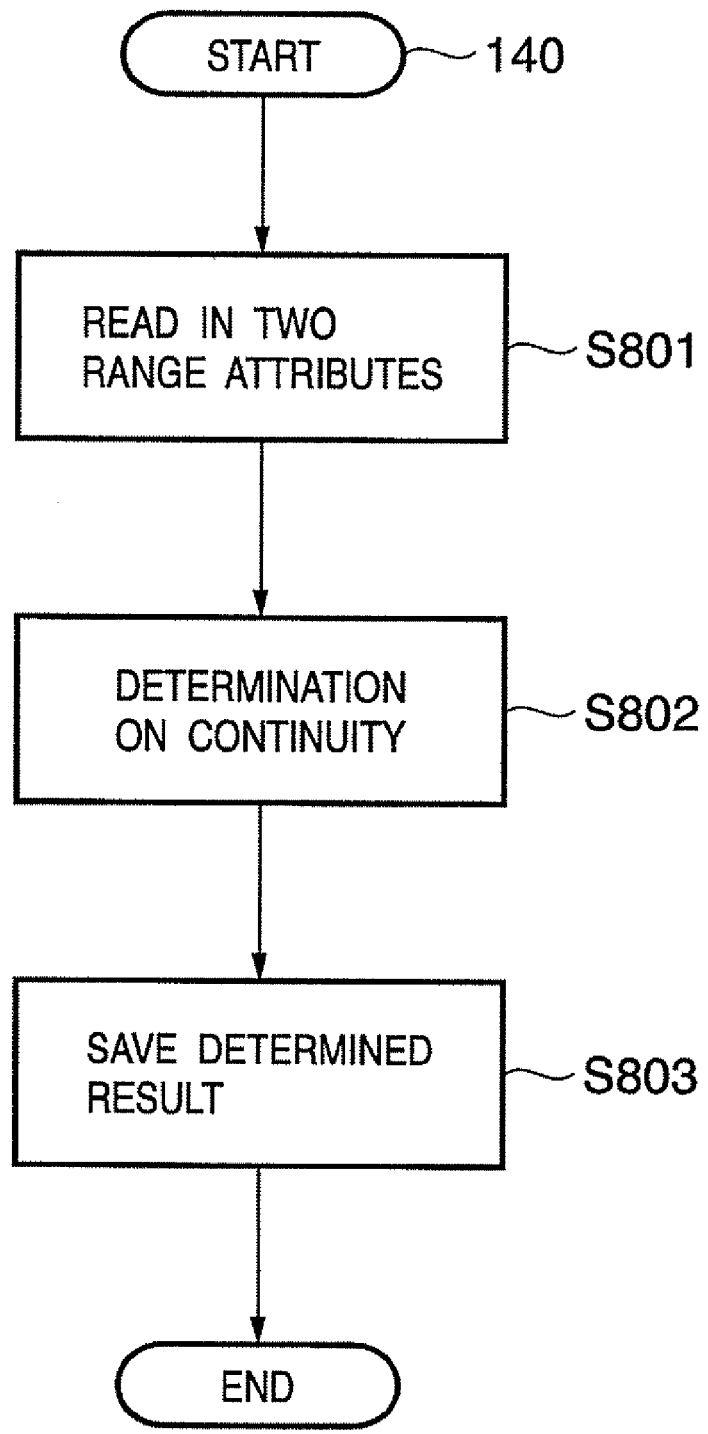
FIG. 8 is a flowchart for illustrating process of a correlation determination program for determining two range attributes, i.e., continuity of range attributes or ranges.

First at the step S501, when the correlation display program 130 is called for an item of noticed information in the objective information, attribute information of the noticed information is newly read in. At this moment, a noticed range and the display attribute to be described later keep values for the previous item of noticed information. Here, the previous item of noticed information corresponds to the audio information A. Next, if an info-attribute of the noticed information is "1", i.e., video information at step S502, the process proceeds to step S503. In step S503, a time period of a noticed range [1], which is a range attribute of the newly read in the noticed information (video information), and a noticed range [2] (recording time period) indicated as a range attribute of the audio information A are compared. Although determination whether it is within the range or not can simply be determination on inclusive relation of time periods, it may be a case of "not continuous" determined by processing of a correlation determination program 140 to be described later (FIG. 8). If it is outside the range here, it is not a correlation, then the process proceeds to step S504, and the display attribute is made "0" i.e., "without background color ("with background color" flag is 0"), and the process proceeds to step S590.

On the other hand, if it is determined that the noticed range [1] is within the noticed range [2] (recording time period) that is indicated as a range attribute of the audio information A at step S503, the process proceeds to step S505. At step S505, as video information of the noticed information is correlated with the audio information A, the display attribute is made to be "1", i.e., "with background color (with background color flag is 1)", and the process proceeds to step S506. At step S506, the display attribute ("1") is added to the display attribute of the audio information A. Therefore, the display attribute is "1" if the display attribute of the audio information A is "0" (yellow), and it is "3" if the information is "2" (blue). It can also be realized by OR operation in stead of the addition. In such a case, the display attribute is a binary digit of "01" or "11". Here, if the display attribute is "01", it is "with background color, yellow", and if the display attribute is "11", it represents "with background color, blue". If the display attribute is "0", it is "without background color", and if the display attribute is "2(10)", it is invalid (without background color).

On the other hand, if the info-attribute of the noticed information is "1", i.e., if it is not video information at step S502, the process proceeds to step S510, and it is determined whether or not the info-attribute is "2" (audio information). Otherwise, the process proceeds to step S590, and continuity with the previous item of noticed information is kept.

On the other hand, if the info-attribute of the item of noticed information is "2", i.e., audio information at step S510, the process proceeds to step S511. At step S511, the noticed range [2] (recording time period) indicated as a range attribute of the audio information A and a period of the noticed range [2] that is a range attribute of video information which are noticed information are compared and continuity is determined in a way shown in FIG. 8.

FIG. 8 is a flowchart for illustrating process of information processing apparatus at step S511 in FIG. 5 based on the correlation determination program 140 for determining continuity of the audio information A and the noticed information.

First, at step S801, the range attribute of the audio information A and the range attribute of the noticed information are read in. Then at step S802, the continuity is determined. Specifically, a recording time period of the range attribute of the audio information A and a period of the noticed range ([1] or [2]) of noticed information are redundant or continuous, it is determined as continuous. If the recording end time of day of the audio information A and the picture recording (recording) start time of day of the noticed information are the same value, a case where a difference between the end time of day and the start time of day is a predetermined value or less, for example a second or less, may be a criterion to consider it continuous.

Next at step S803, the determination result at step S802 is kept and processing by the correlation determination program 140 is ended.

Return to FIG. 5, if it is determined as continuous at step S511, the process proceeds to step S512, and a background color flag of display attribute flags is reversed. That is to say, if it is "yellow 0", it is changed to "blue 2", and if "blue 2", changed to "yellow 0". Then, the process proceeds to step S514. On the other hand, if it is determined as not continuous at step S511, the background color flag of the display attribute flags is reset to "0" (yellow) at step S513, and the process proceeds to step S514. At step S514, audio information which was noticed information is set to the audio information A. Specifically, a noticed range [2] that is a recording time period, which is a range attribute of the noticed information (audio information), is set as a noticed range [2] (recording time period) of the audio information A. Similar to step S506, with background color flag being made "1", and set to a value with the display attribute flags determined at steps S512, S513 added.

At step S510, if the info-attribute is not "2" (including the case where the info-attribute is neither "1" nor "2"), then the process proceeds to the step S590, continuity with the previous item of noticed information is kept. A continuity determination program 140 can be used for the determination.

Figure 6:
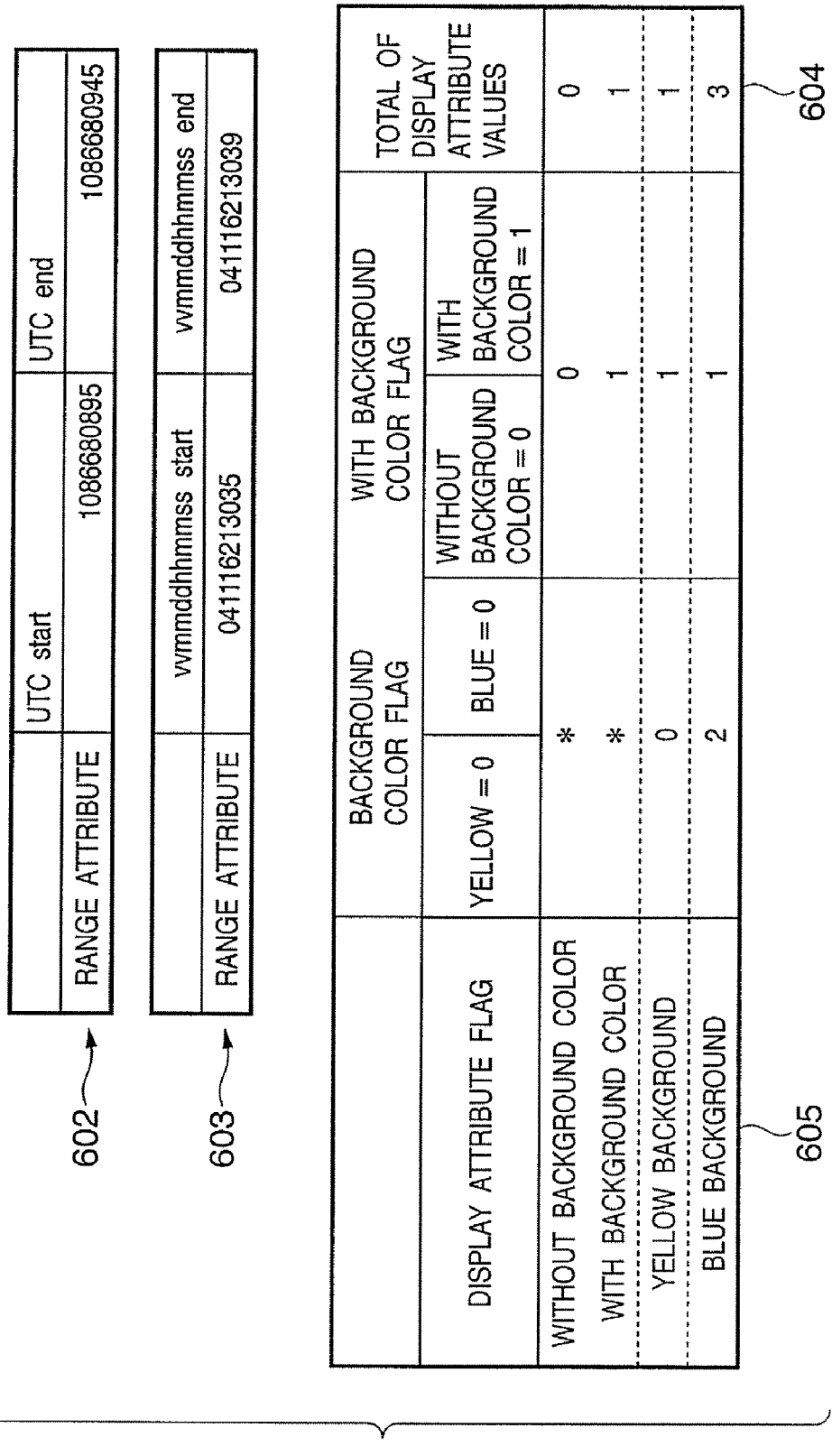
FIG. 6 is a diagram showing an example of range attributes, a display attribute and display attribute flags of the audio information according to the embodiment.

FIG. 6 is a diagram showing examples of range attributes 602, 603, a display attribute 604 and display attribute flags 605 of the audio information according to the embodiment.

Figure 7:
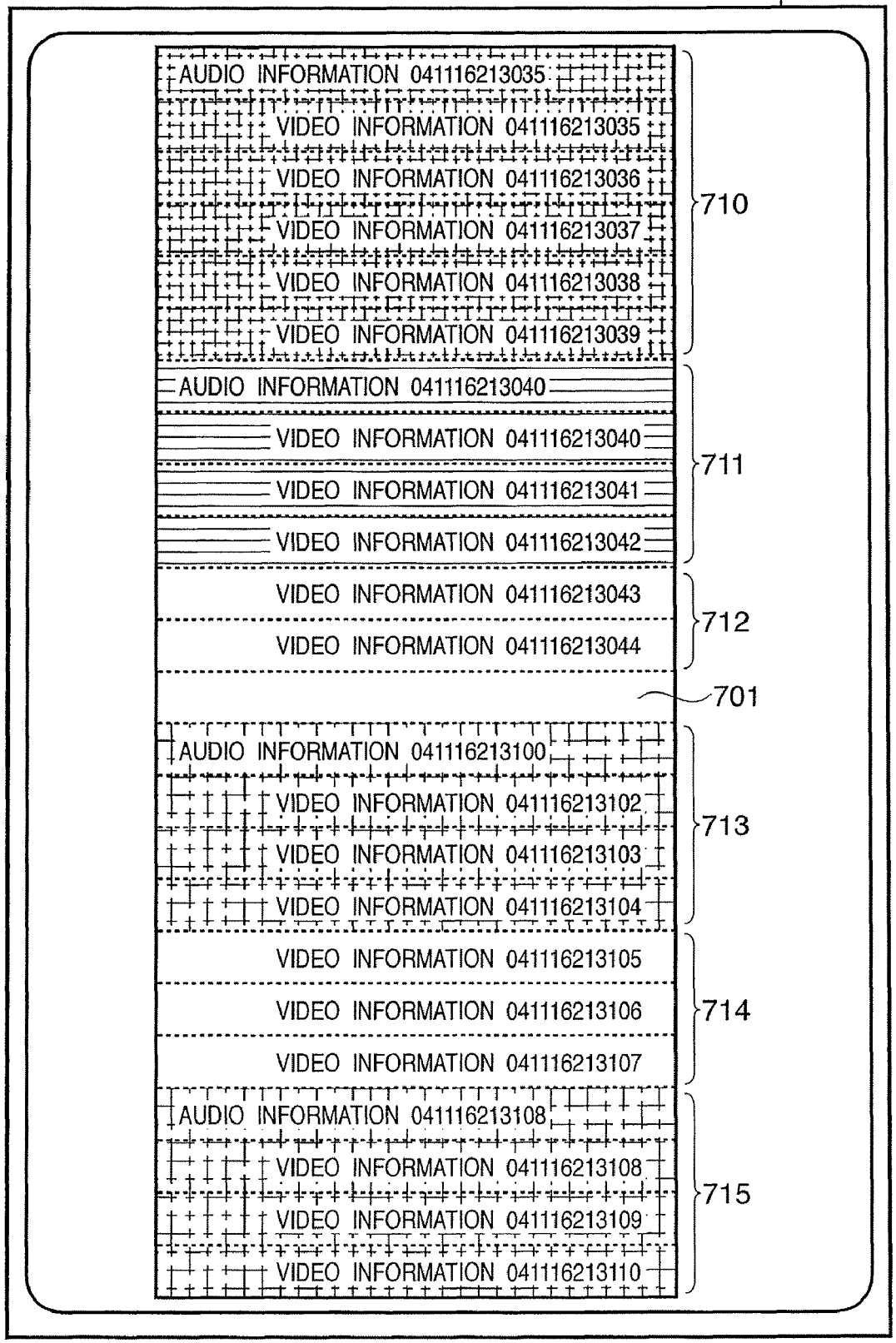
FIG. 7 is a diagram showing an exemplary list display according to the embodiment.

Also FIG. 7 is a diagram showing an exemplary list display according to the embodiment. In FIG. 7, groups 710, 713, and 715 indicate an area whose background color is represented by yellow, and groups 711, 713 indicate an area whose background color is blue, and groups 712, 714 indicate an area without a background color. Twelve digits right to audio and video information indicate year, month, date, hour, minute, and second in a form of "yymmddhhmmss".

In this example, audio information starts at the start time of day "041116213035" and kept for seven seconds, and video information is stored for ten seconds. An audio file is continuously switched to a file (711) next after five seconds. In such a case, as denoted by 710 in FIG. 7, the display attribute of items of video information "041116213035" to "041116213039" is "1" to be "with background color, yellow".

For items of audio information from the start time of day "041116213040" to the end time of day "041116213042", they are made "with background color" to indicate that they are continuous with the above-mentioned audio information and the display attribute flag is reversed at step S512 in FIG. 5. That make the display attributes of items of video information from "041116213040" to "041116213042" are "3" to be "with background color, blue" as shown in a group 711 of FIG. 7. Reverse processing of the background color flag is for make them easily distinguished from a color of a group of audio files (710) immediately before.

An item of video information "041116213043" of a group 712 of FIG. 7 is determined as outside the range (mute) of audio information "041116213040" to "041116213042" at step S503 of FIG. 5. Therefore, at step S504, the display attribute 603 is set to "0" (without background color). Then at step S590, it is determined that the previous noticed information, i.e., video information "041116213042" and the current noticed information, i.e., video information "041116213043" are continuous. Similarly, the next video information "041116213044" is continuously displayed as noticed information of "without background color" at step S405.

Audio information "041116213100" shown in the group 713 is determined as not continuous at step S511, and a display indicating non-continuity such as a blank line 701 is done at step S405.

If a range attribute of the audio information "041116213100" is from "041116213100" to "041116213104", items of video information from "041116213102" to "041116213104" are determined as within the range similar to the processing mentioned above. Then, the display attribute becomes "1" (with background color, yellow) (group 713 in FIG. 7). Then, as items of video information "041116213105" to "041116213107" shown in a group 714 are outside the corresponding range [2], the display attributes of the items of video information are "without background color".

Audio information "041116213108" newly starts in a group 715, items of video information from "041116213108" to "041116213110" are determined as within the range, and the display attributes of the items of video information are reset to "with background color, yellow".

In FIG. 7, audio information whose referential info-attribute is "2" is displayed from the top of a line, and items of video information whose info-attribute are "1" are indented. The present invention is not limited to this, and both of the information may be displayed in the same column or given different attributes. A display attribute may be determined for each information attribute.

Figure 9:
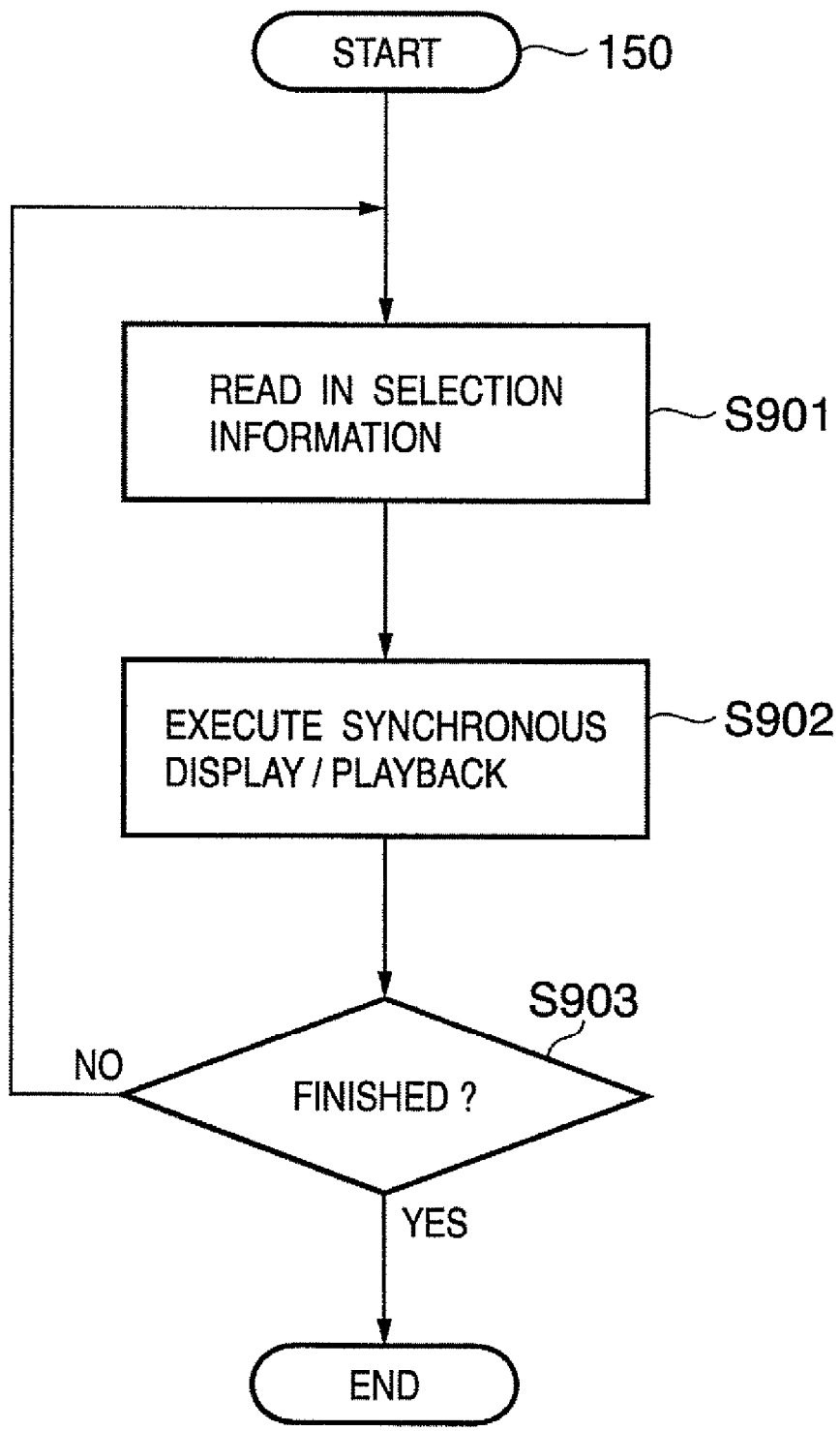
FIG. 9 is a flowchart for illustrating synchronous playback process by a synchronous playback program executed in the information processing apparatus according to the embodiment.

FIG. 9 is a flowchart for illustrating synchronous playback process by a synchronous playback program 150 executed in the information processing apparatus 100 according to the embodiment.

Figure 10:
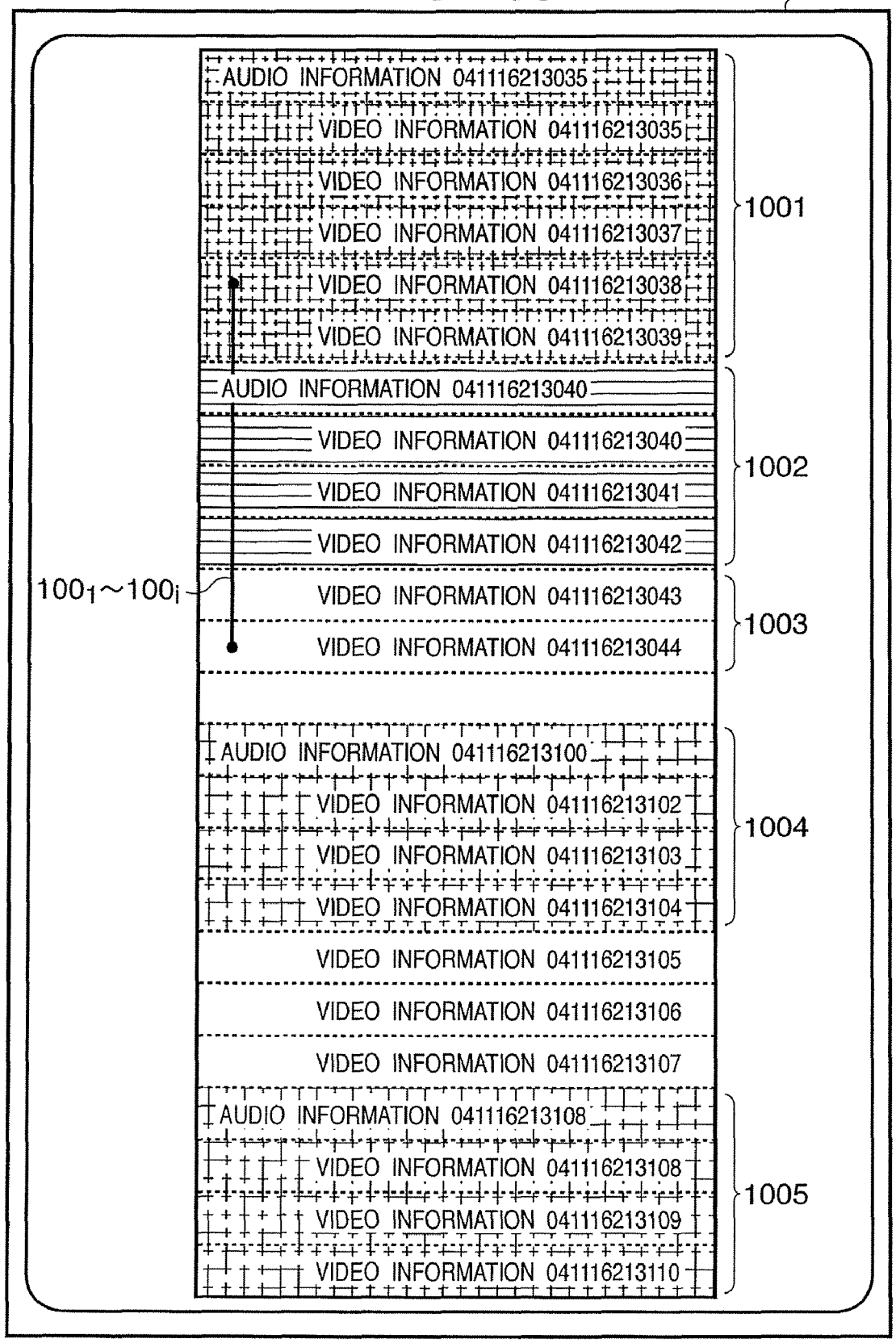
FIG. 10 is a diagram for illustrating an example where selection information is selected in the first embodiment.

First, at step S901, a part of objective information of a list display is selected as the corresponding selection information items $100_1$-$100_i$ (FIG. 10) and the synchronous playback program 150 is called. In the first embodiment, as shown in FIG. 10, it is assumed that items of video information from "041116213038" to "041116213044" are selected in the objective information. In FIG. 10, areas 1001, 1004, and 1005 are displayed with the background color of yellow, and an area 1002 is displayed with the background color of blue. The area 1003 is an area without a background color.

Next at step S902, synchronous display/playback is done with the time of day as a key. If it does not finish at step S903, synchronous display/playback at step S902 is repeated.

Here, audio information for items of video information from "041116213038" to "041116213039" denoted by 1001 in FIG. 10 and audio information for items of video information from "041116213040" to "041116213042" denoted by 1002, and the selected items of video information from "041116213038" to "041116213044" are used and synchronous display/playback is done. For a time period without audio information, mute playback may substitute for it.

Although in FIG. 10 according to the first embodiment, audio information comes at the top of a line and video information is indented for easier visual recognition as similar to FIG. 7, the present invention is not limited to this. A display attribute may be determined for each information attribute. That enables items of information independently collected to be listed, and for selected and synchronously played back items of information, correlation of synchronization between video information and audio information can be clearly specified in advance. Accordingly, preferred or interesting items of information can be selected and played back.

[Second Embodiment]

In the second embodiment, processing where a plurality of network cameras 300 are used and range attributes of a recording time periods of audio information (noticed range [2]) are overlapped is described. A configuration of apparatus and a system according to the second embodiment is the same as that of the first embodiment mentioned above. It is realized when the correlation display program 130 is replaced with another correlation display program (131 of FIG. 14) and the correlation determination program 140 is replaced with another correlation determination program (141 of FIG. 14).

Figure 11A:
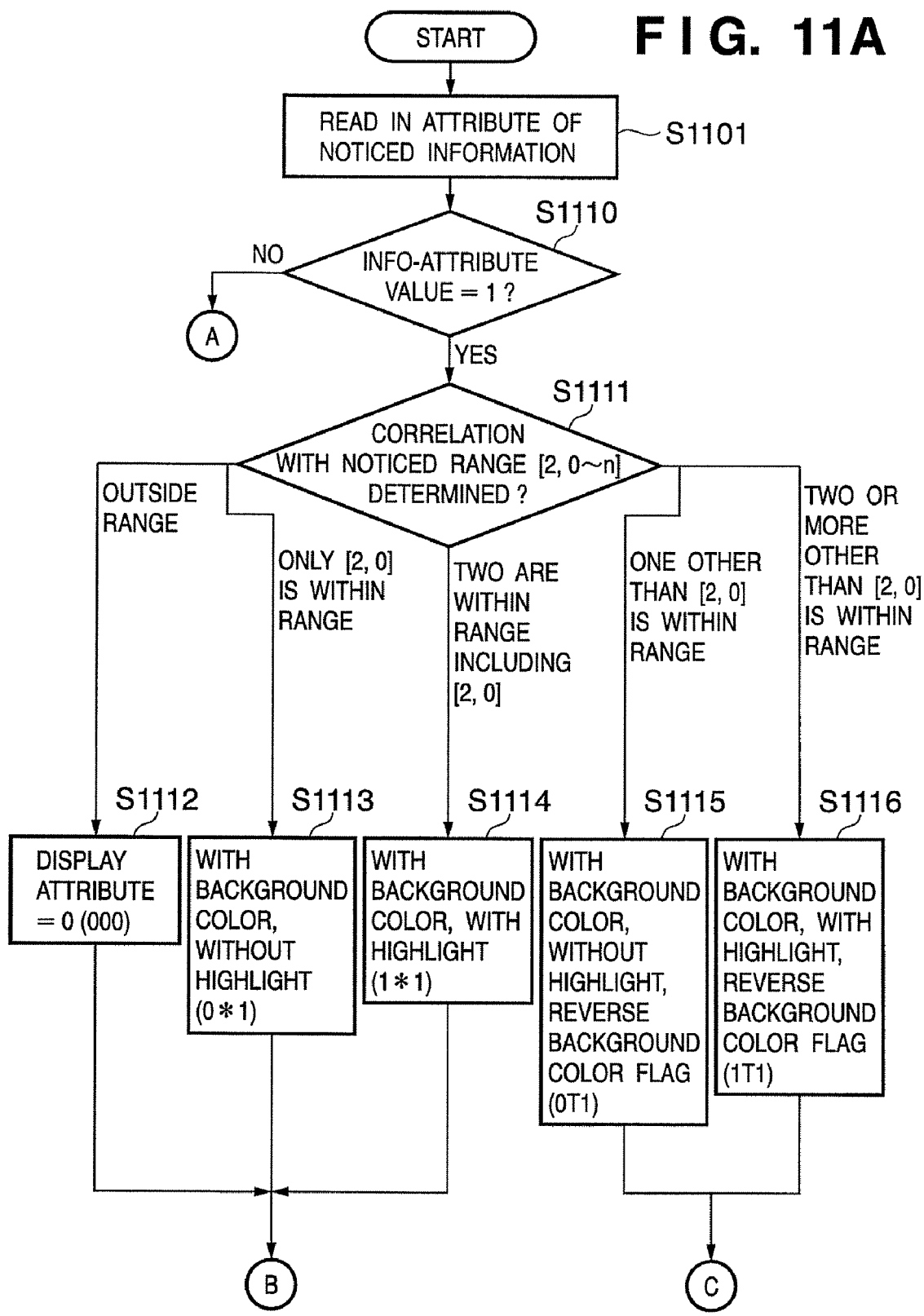

FIGS. 11A and 11B are flowcharts for illustrating process of a correlation display program (correlation display program 131) executed in the information processing apparatus 100 according to the second embodiment of the present invention. That is the same as in the fist embodiment mentioned above in that a noticed range which is video information and whose information attribute is identified by "1" is described as a noticed range [1], and a noticed range which is audio information and whose information attribute is identified by "2" is described as a noticed range [2]. The $n^{th}$ noticed range in the noticed range [2] is described as the noticed range [2, n]. Further in the second embodiment, the "highlight flag" for highlighting (emphasizing) a display is added to display attribute flags for a display attribute. The other assumptions in the second embodiment are equivalent to those of the correlation display program 130 of FIG. 5 according to the first embodiment.

In FIGS. 11A and 11B, step S1101, step S1110, and step S1120 are the same as step S501, step S502, and step S510 of FIG. 5 mentioned above, respectively.

At step S1110, if newly read noticed information is video information, the process proceeds to step S1111. At step S1111, correlation between a period of a noticed range, which is a range attribute of the newly read noticed information (video information) and a period of noticed ranges [2, 0–n] are determined respectively. Determination of the correlation is done by the correlation determination program 141 to be described later. At step S1111, if it is determined as outside all the noticed ranges [2, 0–n] (recording time period), it is determined that the read noticed information has not correlation and the process proceeds to step S1112. At step S1112, the display attribute of the read noticed information is "0", i.e., "without background color", and the process proceeds to step S1190 (FIG. 11B). For example, if only the noticed range [2, 0] is included in the range of the noticed information, i.e., if a recording time period of noticed information (video information) has continuity in correlation only with the noticed range [2, 0], the process proceeds to step S1113. Then, the "with background color" flag, which is the display attribute of the noticed information, is made "1" to be a value which is ORed with the display attribute flags. Then, the process proceeds to step S1190. That makes display of the newly read noticed information is "with background color, yellow" or "with background color, blue".

If within a range of two or more noticed ranges [2, 0–k] including the noticed range [2, 0], i.e., a recording time period of a range attribute of noticed information (audio information) has continuity in correlation with a range attribute of two or more noticed ranges [2, 0–k], the process proceeds to step S1114. In such a case, the display attributes are made as the "with highlight (emphasized), with background color" flags being "1" respectively to be a value which is ORed with the display attribute flags, and the process proceeds to step S1190. With the flags set, display of an item corresponding to the newly read noticed information is "with background color, yellow, with highlight" or "with background color, blue, with highlight".

If it is outside the noticed range [2, 0] and has continuity with a noticed range of noticed information, in which only one of the noticed ranges [2, 1–n] is newly read, the process proceeds to correlation step S1115. At step S1115, the display attributes are made as the "without highlight, with background color" flags being "1" respectively and the "background color" flag of the display attribute flags reversed to be a value ORed, and the process proceeds to step S1180 (FIG. 11B). With the flags set, a display of an item corresponding to the newly read noticed information is "with background color, blue" or "with background color, yellow".

If a noticed range (recording time period) of the newly read noticed information is outside the noticed range [2, 0], and two or more of the noticed ranges [2, 1–n] are within the range, the process proceeds to the correlation step S1116. At step S1116, the display attribute is made as the "with highlight, with background color" flags being "1" respectively. A value resulted from the "background color" flag of the display attribute flag reversed and ORed is set as the display attribute, and the process proceeds to step S1180. A display of an item corresponding to the newly read noticed information is "with background, blue, with highlight" or "with background, yellow, with highlight".

At step S1180, the noticed ranges [2, 0–n] to be used in correlation determination is updated. That update is executed after step S1115 and step S1116, and step S1122 to be described later. That is to say, it is a case where a period of a range attribute of a noticed range [2, 0] finishes before the start time of day of the range attribute of the newly read noticed information and become not objective and unwanted.

At the moment, ranges whose recording end time of day is before the start of the range attribute of the noticed information in the noticed ranges [2, 0–n] are discarded. The discarded result is shifted forward in order or allocated and set in order from "0" to the newest n. That is equivalent to make it the noticed ranges [2, 0–n] in which "0" is the oldest and "n" is the newest, as stored information is sorted at step S403 of the list display program 120.

At step S1120 (FIG. 11B), if an info-attribute is determined as "2" (audio information), the process proceeds to step S1121, and it is determined whether or not correlation between a period of a range attribute of noticed information (audio information) and a period of noticed ranges [2, 0–n] which is a range attribute whose information attribute is the same "2" (audio information). Determination of the correlation is done with a correlation determination program 141 to be described later.

At step S1121, if it is determined that the range attribute of noticed information is outside the noticed range [2, 0] and within the range of any of the noticed ranges [2, 1-n], i.e., if the noticed range [2, 0], which is the current reference and an element to determine the display attribute, finishes before start of the range attribute of the noticed information which is to be displayed, the noticed range [2, 0] is no longer a reference. Therefore, the process proceeds to step S1122, and make the "background color" flag corresponding to audio information of the noticed range [2, 0] reversed to be the "background color" flag of the noticed information. That prepares for switching the reference. Then, as one of the noticed ranges [2, 1-n] is determined as a range attribute which overlaps with a range attribute of the noticed information (audio information), the highlight flag is set to "1". A range attribute of the noticed information (audio information) is set to the noticed ranges [2, n+1] which is identified by information attribute "2", the variable n is incremented and the process proceeds to step S1180 and the noticed ranges [2, 0-n] are updated.

Also at step S1121, if a recording time period of the noticed information is within the noticed range [2, 0], i.e., if it is overlapped with the noticed range [2, 0] and has continuity, the process proceeds to step S1123. At step S1123, the "background color" flag is reversed and the highlight flag is set to "1". A range attribute of the noticed information (audio information) is set to the noticed range [2, n+1] identified by information attribute "2", the variable n is incremented and the process proceeds to step S1190.

Also at step S1121, if it is determined that it is outside the noticed ranges [2, 0-n] and has continuity, i.e., if noticed information which has continuity with any of the noticed ranges [2, 0-n] is to be displayed, the process proceeds to step S1124. The "background color" flag of a display attribute, which was the previous noticed information, is reversed to be set as "with background color". The noticed ranges [2, 0-n], which is identified by the information attribute "2", is cleared and a range attribute of the noticed information (audio information) is newly set to the noticed range [2, 0], the variable n is cleared to "0", and the process proceeds to step S1190.

At step S1121, if it is determined as outside the noticed ranges [2, 0-n] and has no continuity, i.e., if noticed information without continuity with any of the noticed ranges [2, 0-n] is to be displayed, the process proceeds to step S1125. Then, the "background color" flag is reset to "0", and the "with background color" flag is set to 0. The noticed ranges [2, 0-n], which are identified by the information attribute "2", are cleared and a range attribute of the noticed information (audio information) is newly set to the noticed range [2, 0], the variable n is cleared to "0", and the process proceeds to step S1190.

At step S1190, the set display attribute is kept.

The procedure of the correlation determination program 141 according to the second embodiment will be described.

Processing by the correlation determination program 141 is almost the same as the correlation determination program 140 (FIG. 8) according to the first embodiment mentioned above. A difference between them is that range attributes read in at step S801 are a set of a range attribute of noticed information and noticed ranges [2, 0-n]. Another difference is that determination processing of continuity at step S802 is replaced with correlation determination shown at step S1111 (FIG. 11A) or step S1121 (FIG. 11B) of the correlation display program 141. The determination is realized when each of a plurality of ranges is checked one by one as in a conventional technique. Determination of continuity can be realized in the same manner as that at step S802 of the first embodiment mentioned above.

FIG. 12 is a diagram showing an example of a list display according to the second embodiment. In the figure, bold prints represent highlights. Similar to FIG. 7 mentioned above, groups 1201, 1203, 1206 and 1208 are displayed in yellow backgrounds, and groups 1202, 1204, and 1207 are displayed in blue backgrounds, and group 1205 and 1209 have no background color. Twelve digits indicate year, month, date, hour, minute, and second.

First, in a time period which is a range attribute of audio information, i.e., a period whose start time of day is "041116213035" and whose end time of day is "041116213039", the audio information is set as "with background color" and the background color is reset at step S1125. Then, a range attribute of audio information "041116213100" (background color is yellow) is set to the noticed range [2, 0] and n=0 is set. The video information is set as "with background color (without highlighted)" at step S1113. As a result, the display attribute of the audio information "041116213035" and items of the video information from "041116213035" to "041116213037" are "with background color, yellow, without highlight" (1201).

As a period of a range attribute of audio information "041116213038", whose start time of day is "041116213038" and whose end time of day is "041116213040", is determined to be overlapped with the audio information "041116213035" by correlation determination, the highlight flag is set and the background color flag is reversed as display attribute processing at step S1123. The items of the video information "041116213038", "041116213039" are set as "with background color" and the highlight flag is set as display attribute processing at step S1114. That makes a display attribute of the audio information "041116213038" and the items of the video information from "041116213038" to "041116213039" become "with background color, blue, with highlight" (1202).

The audio information "041116213035" mentioned above is outside the noticed range [2,0] for a period of a range attribute of the audio information "041116213040", whose start time of day is "041116213040" and whose end time of day is "041116213042". It has two or more overlaps within the noticed range [2, 1(−1)] in correlation determination with the audio information "041116213038". As a result, the highlight flag is set and the background color flag is reversed as display attribute processing on the audio information "041116213040" at step S1122. Next at step S1180, it is updated to a noticed ranges [2, 0-1], n=1. The video signal sets the highlight flag at step S1114 to make the display attribute of the audio information "041116213040" and the video information "041116213040" "with background color, yellow, with highlight" (1203).

If a period of a range attribute of video information "041116213041" has a start time of day of "041116213041" and an end time of day of "041116213041", it is determined as outside the noticed range [2, 0] and within a noticed range [2, 1] at step S1111. Therefore, the process proceeds to step S1115, and the highlight flag is reset (0) and the background color flag is reversed. Then, at step S1180, it is updated to noticed ranges [2, 0-0], n=0. That makes the display attribute of the video information "041116213041", "041116213042" "with background color, blue, without highlight" (1204).

A period of a range attribute of video information "041116213043" is defined by a start time of day of "041116213043" and an end time of day of "041116213043". As it is outside the noticed range [2, 0 (−0)] at step S1111 in such a case, the process proceeds to step S1112, and a display attribute is made "0". That makes the display attribute of items of the video information "041116213043", "041116213044" be "without background color" (1205).

Then, audio information becomes "041116213100", and if determination at step S1190 is stated too early, it is determined as not continuous, and a display indicating non-continuity such as a blank line or a return is done at step S405 (1210).

A period of a range attribute of the audio information "041116213100" has a start time of day of "041116213100" and an end time of day of "041116213104". As it is determined that it is outside the range and non-continuous at step S1121 in such a case, the process proceeds to step S1125, and "with background color" is set and "background color" is reset. Then, a range attribute of the audio information "041116213100" is set to the noticed range [2, 0], and n=0 is set. Then, the display attribute of the audio information "041116213100" and items of video information from "041116213102" to "041116213103" are "with background, yellow, without highlight" (1206).

Further, a period of a range attribute of audio information "041116213104" has a start time of day of "041116213104" and an end time of day of "041116213106". As it is determined as within the noticed range [2, 0] at step S1121 in such a case, the process proceeds to step S1123, and the background color flag is reversed. The video information is set to "with background color" and "with highlight" at step S1114. That makes the display attribute of the audio information "041116213104" and the video information "041116213104" "with background color, blue, with highlight" (1207).

Further, a period of a range attribute of video information "041116213105" has a start time of day of "041116213105" and an end time of day of "041116213106". It is determined that it is outside the noticed range [2, 0] and within the noticed range [2, 1] at step S1111 in this case. Therefore, the process proceeds to step S1115, and "with background color" is set and the background color flag is reversed and "without highlight" is set. Then at step S1180, it is updated to the noticed range [2, 0(-0)]. At step S1113, only "with background color" is set. That makes the display attribute of items of the video information from "041116213105" to "041116213106" "with background color, yellow, without highlight" (1208).

The display attribute of the next video information "041116213107" becomes "without background color" at step S1112 (1209).

According to the second embodiment, a plurality of items of independently gathered stored information are listed, and correlation and multiplicity of synchronization of video information and audio information from each network camera can be specified. That can make video or audio information to be subject to synchronization and playback easily selected.

The "highlight" may not be displayed in bold prints. A highlight degree may be displayed such that the overlap of characters is doubled, or tripled as the degree of the highlight.

[Third Embodiment]

In the third embodiment, a case where coordination in a list display (the captured position is captured from another position) is specified when video information and audio information are played-back, as a range attribute is applied to a space. A block diagram of a system according to the third embodiment is assumed that, in the information gathering system of FIG. 1 of the first embodiment, the list display program 120 is replaced with a list display program 122 and the correlation determination program 140 is replaced with a correlation determination program 141, respectively. As a hardware configuration of the apparatus is the same as the above-mentioned embodiment, the description of it will be omitted.

In the correlation display program according to the third embodiment, an info-attribute where noticed information is video information is assumed to be "1" and an info-attribute for audio information is assumed to be "2". The range attribute is defined by, for example, the upper left of the view angle and the lower right of the view angle of the noticed information. The view angle is shown as a space on a coordinate axis from the upper left (−180, 90) to the lower right (180, −90) angles with a movable center for pan, tilt, and zoom of a camera being (0. 0) (see FIG. 13).

On the other hand, a range attribute of audio information whose information attribute is "2" is assumed be in a range of a view angle shot by a camera in a recording time period, for example. This case is easily imagined when a case where a directional microphone is directed in the same direction as that of a camera on the panhead is considered.

Process of a list display program according to the third embodiment will be described. Processing by the list display program is almost equivalent to that of the list display program 120 of FIG. 4. A difference between them is that an origin (for example the upper left) in a space shown by the range attribute is used in sorting by range attributes at step S403. More specifically, in the third embodiment, it is sorted by values of P in the direction of pan within the upper left of the view angle (P, T), for example. The present invention is not limited to this and it can be sorted by values by a function regarding to a space shown by T in the direction of tilt, or Z, which is a zoom value of a view angle, or a range attribute obtained from the P, T, and Z. Hereafter, it is assumed that it is sorted by values by a function f.

Operation of correlation determination program according to the third embodiment will be described.

Processing of the correlation determination program is almost the same as processing of the correlation determination program 140 (FIG. 8) according to the first embodiment mentioned above. A difference between them is that the first embodiment is for determining continuity of a recording (shooting) time period as a range attribute, while the third embodiment is for determining whether it is continuous in a space or not.

Figure 13:
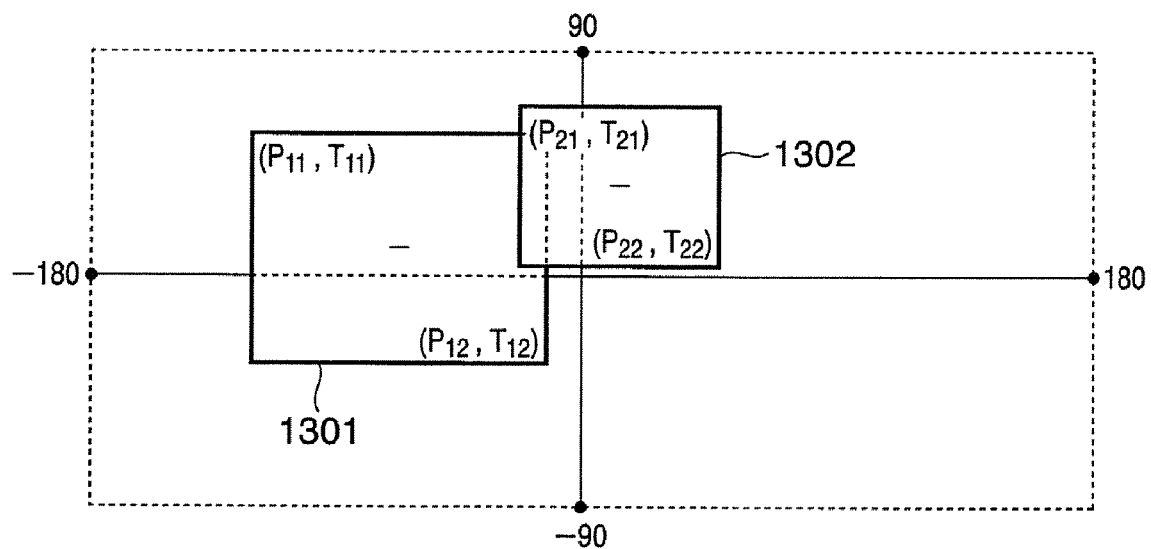
FIG. 13 is a diagram showing a space, which is a range attribute according to the third embodiment.

FIG. 13 is a diagram for illustrating the embodiment.

There are a space 1301 (P11, T11)-(P12, T12) of the first range attribute and a space 1302 (P21, T21)-(P22, T22) of the following second range attribute. If there are a space (P11, T11)-(P22, T22) and a space (P21, T21)-(P12, T12) (i.e., they are overlapped on each other), the two ranges are assumed to be continuous. More specifically, if P21=P12, or P22=P11, or the direction of pan is T21=T12 or T22=T11, a direction of tilt is assumed to be continuous outside the range.

Further, similar to the first and the second embodiment, if the direction of pan where P21-P12<X or P11-P22<X is a positive number less than a predetermined X, or if the direction of tilt where T21-T12<X or T11-T22<X is a positive number less than a predetermined X (i.e., they are slightly at a distance), they may be considered as continuous.

It also can be assumed as continuous within a range only in the case where an overlapped space is more than a particular area. That is to say, if it is less than a particular area, it can be considered as non-continuous outside the range (as they are slightly overlapped, it is not actually seen continuous). Such an overlap of spaces can be determined by another technique in conventional arts.

The third embodiment is treated as a two dimensional space by a view angle, the present invention is not limited to this and can treated as a space in a third dimension. In such a case, a space defined by a conventional global positioning system such as a conventional GPS and the range to be captured is treated as third dimensional space. That enables correlation to be determined even when a plurality of cameras are used, and correlation determination of the third embodiment can be replaced by this. At this moment, the range attribute of audio information may be treated as a bycenter of the entire of the image capture space in recording or a position of a space defined by a global positioning system of the recording unit 303, which can be realized by conventional techniques.

FIGS. 13 and 18 are diagrams showing examples of space indicating a range attribute of video information.

The range attribute of FIG. 13 is assumed to be a two dimensional space by a view angle as mentioned above. On the other hand, the range attribute of stored information stored in the image capture unit 301 of the network camera 300 of FIG. 18 is assumed to be a three dimensional image capture space, and the range attribute of stored information stored in the image capture unit 303 is assumed to be a position of the three dimensional recording unit 303.

The range attribute of the noticed information according to the third embodiment is sorted by the function f at the step in the list display program 122 according to the second embodiment, which is equivalent to step S403 of the list display program 120. Therefore, if a function f sorts with a value of pan, for example, continuity, multiplicity and the degree of multiplicity of video from left to right are specified. That makes collected information collected independently is listed and correlation (the same position) of positions of video information and audio information is previously specified for the information selected from the collected information and is subject to synchronous playback. Accordingly, preferred information can be selected.

[Fourth Embodiment]

In the first to third embodiments, although video information and audio information are used in stored information, the present invention is not limited to this. It can treat in the same manner the case where event such as a contact input or motion detection occurs and event information with a range attribute added is also stored from the time of day information at the moment or a state of the camera 300 into the stored items of information $17_1$-$17_n$. For example, a list display can be done, while synchronization/multiplicity/the degree of multiplicity of items of video information and event information stored are specified with audio information whose information attribute value is "2" being as a reference.

[Fifth Embodiment]

In the second embodiment mentioned above, although a list regarding synchronization, multiplicity and the degree of multiplicity is mentioned as shown in FIG. 12, specifying means is not limited to this. The fifth embodiment specifies synchronization/multiplicity/the degree of multiplicity more specifically by grouping for each time of reversing when the background color flag is reversed by processing of the correlation display program of FIG. 11.

Figure 14:
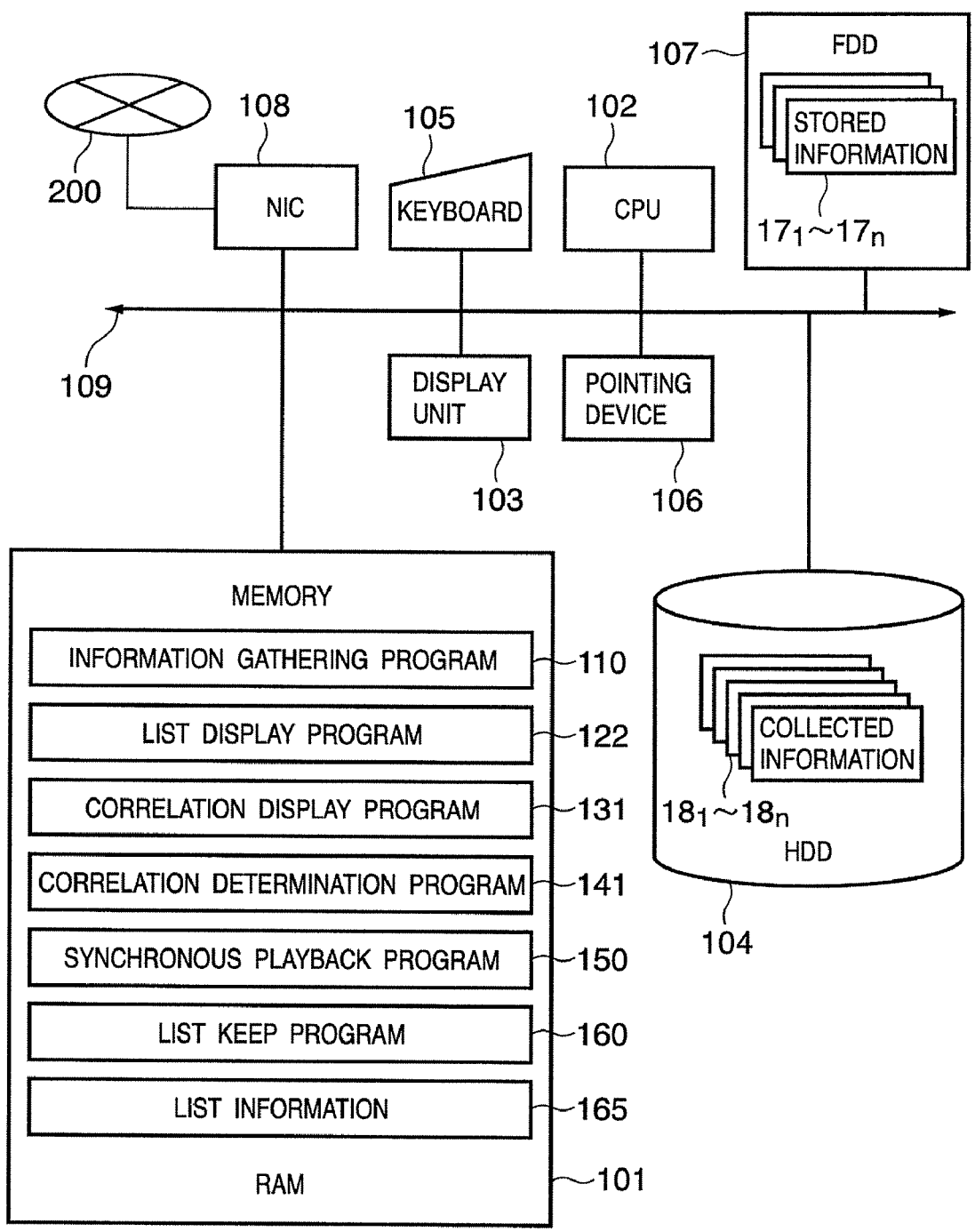
FIG. 14 is a block diagram of a system according to the fifth embodiment.

FIG. 14 is a block diagram of a system according to the fifth embodiment, in which parts common to those in the block diagram (FIG. 1) according to the first embodiment mentioned above are denoted by the same reference characters and numerals. The description of the parts will be omitted. Compared to FIG. 1, the list display program 120 (FIG. 1) is replaced with the list display program 122. A list keep program 160 and list information 165 are newly added.

Operation of the list keep program 160 according to the fifth embodiment will be described below.

The list keep program 160 executes processing almost equivalent to the list display program 120 of the first embodiment mentioned above. That is to say, a display attribute of noticed information is kept in the memory 101 with the display information exemplified in FIG. 12 as list information 165, instead of displaying the information at step S405 of FIG. 4. The display attribute is kept as its display attribute flag when it is kept. The display attribute is equivalent to an attribute to which synchronization/multiplicity is shown. That makes the information to be more easily viewed when it is listed.

Figure 15:
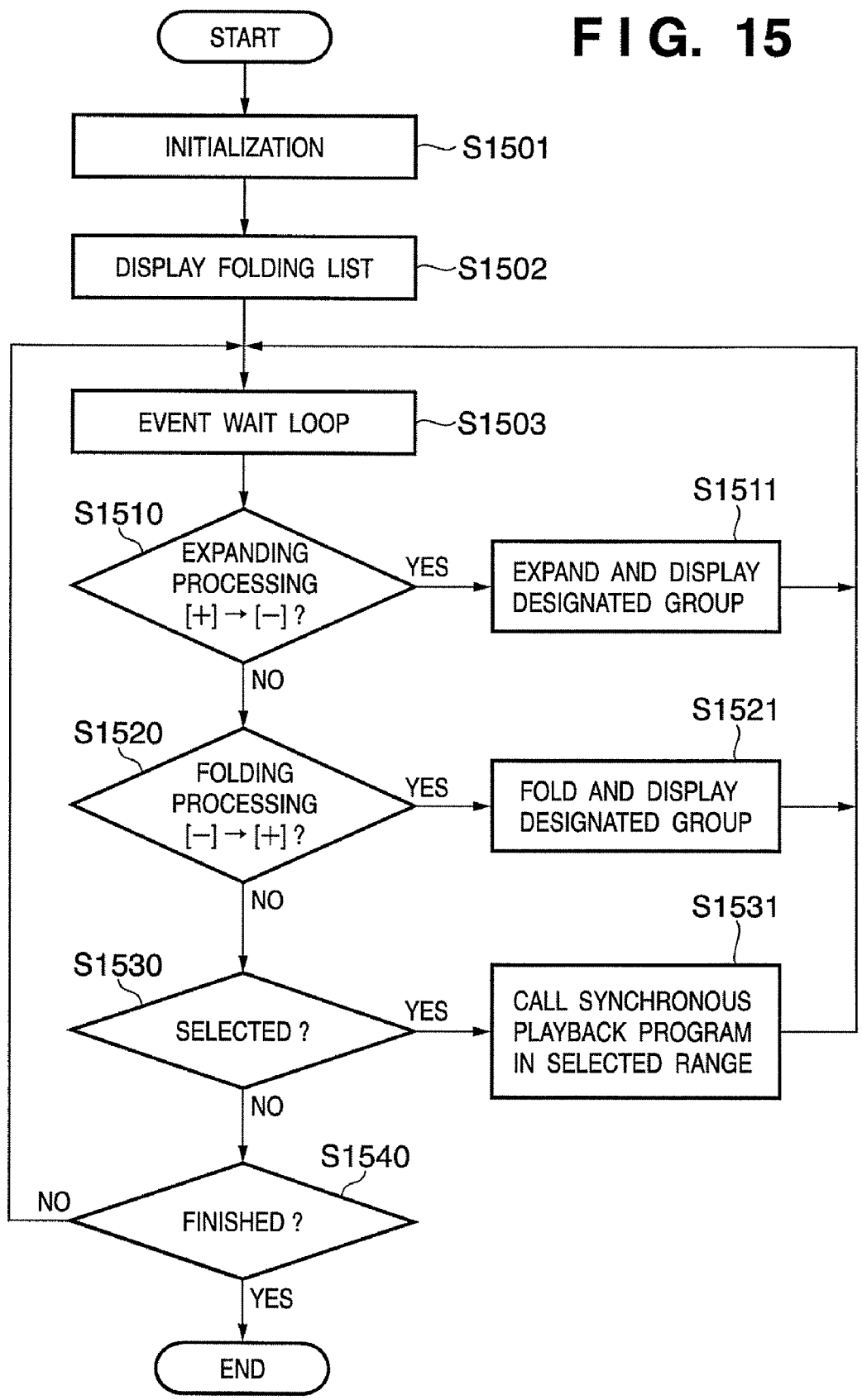
FIG. 15 is a flowchart for illustrating process of the list display program according to the fifth embodiment.

FIG. 15 is a flowchart for illustrating operation of the list display program 122 according to the fifth embodiment.

First at step S1501, the list information 165 is read in from the memory 101 and initialized. At this moment, if the "with background color" flag of the display attribute is "1", i.e., if there is a background color, the information is grouped each time the background color flag is reversed. Specifically, it is grouped for each of the yellow background color and the blue background color in FIG. 12, for example. Those with no background color are not grouped. That is to say, as those with background colors have stored information in a synchronization/coordination relationship, each group is displayed by the unit which can be subject to synchronous/coordination playback. As the presence of the "highlight" flag is used as it is, the presence of stored information with another correlation can also be specified.

At step S1502, only noticed information at the top of each group is displayed with "folding" attribute added.

Figure 16A:
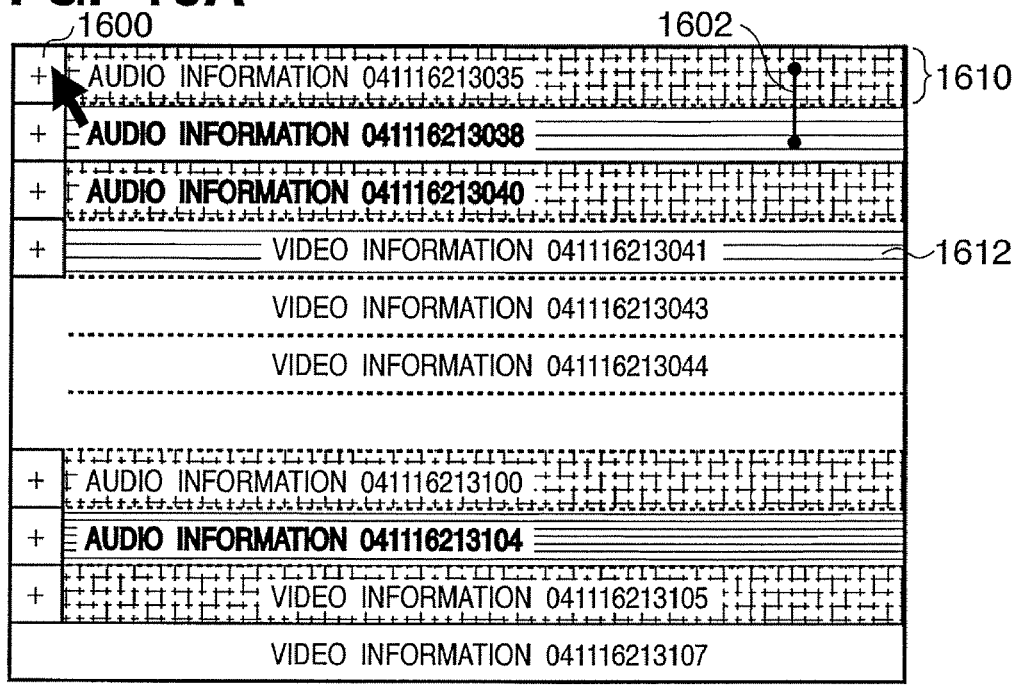
FIGS. 16A and 16B are diagrams showing examples of display according to the fifth embodiment.
Figure 16B:
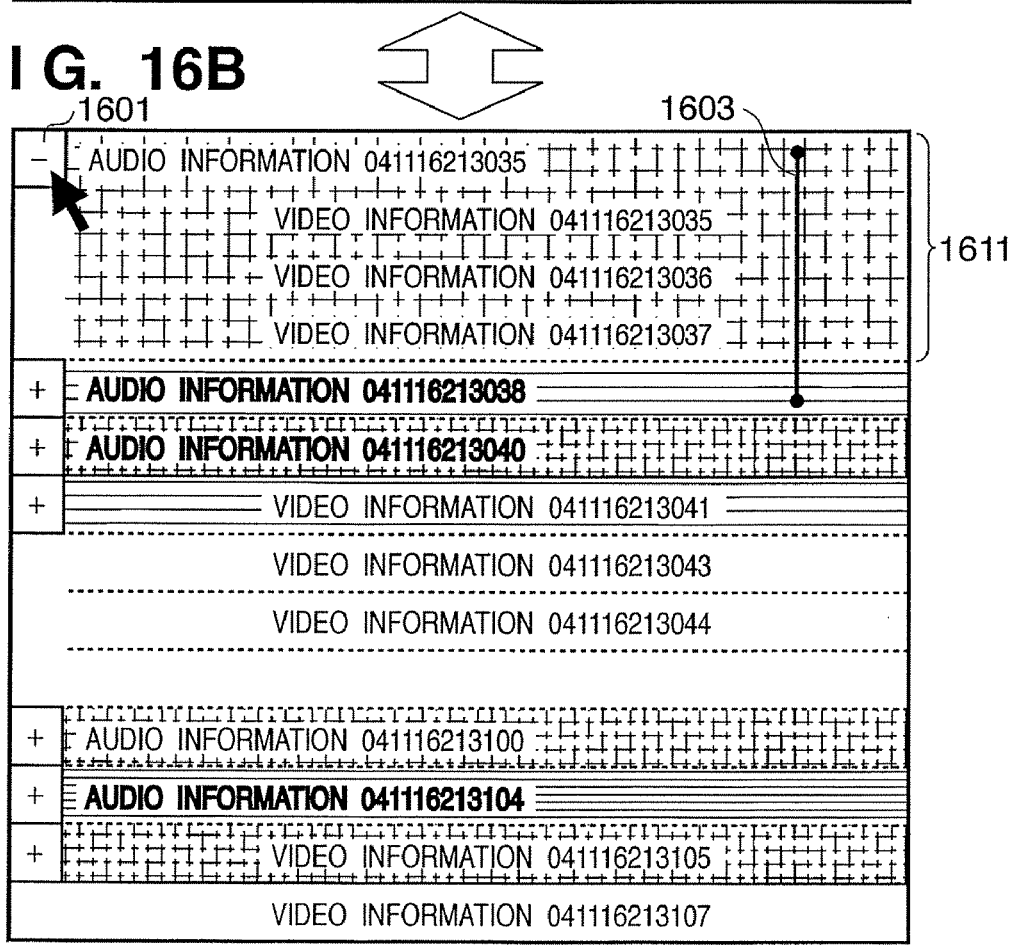

FIGS. 16A and 16B are diagrams showing examples of display according to the fifth embodiment.

As shown in the figures, it is displayed as an icon 1600 such as "+", for example, is added at the top. Here, as denoted by 1602, video information from "041116213035" to "041116213037" (FIG. 12) relevant to audio information "041116213035" as denoted by 1603 is folded and invisibly displayed as denoted by 1602.

At step S1503, occurrence of an event is waited for. When an icon 1600 indicating a "folding" attribute in FIG. 16A is clicked, for example, using a pointing device 106, the process proceeds to step S1510, and it is determined as expanding processing. Specifically, at step S1511, a display "+" of a "folding" attribute is changed to a display "−" of an "expanding" attribute (1601 of FIG. 16B). Then, as denoted by 1603 of FIG. 16B, all the noticed information in a group of audio information "041116213035" is displayed.

When the event for which a display "−" 1601 of an "expanding" attribute is clicked on at step S1503 occurs, it is determined as folding processing at step S1520. Then, operation proceeds from step S1520 to step S1521, and the display "−" of "expanding" attribute is changed to the display "+" of "folding" attribute and display processing is done to hide noticed information other than the top of the group.

Also as similar to the first embodiment, when an item of stored information listed is selected at step S1503, the process proceeds to step S1531, and a synchronous playback program 150 is called.

Also in FIG. 16A, when a group 1610 displayed with a "folding" attribute is selected as shown in the selected range 1602, entire of the corresponding stored information 1611 (FIG. 16B) in the group is considered to be selected. At this moment, "background color is blue, with highlight" following to "background color is yellow, without highlight" is selected. Further, as a start time of day of further following audio information "041116213040" 1612 is different from that of audio information "041116213038" of a selected range, the selected range 1602 can be subject to synchronous playback for audio information "04111623035". When a finishing event occurs at step S1540, the list display program 122 is ended.

When collected information independently collected is listed in this manner, the information can be grouped by the unit which can be subject to synchronization/coordination with folding display, and correlation of synchronization/coordination/multiplication to be specified and displayed, and desired information can be selected based on this.

[Sixth Embodiment]

In the embodiment, preferred processing in specifying synchronization/coordination/multiplication/the degree of multiplication of three or more kinds of stored information will be described.

Figure 17A:
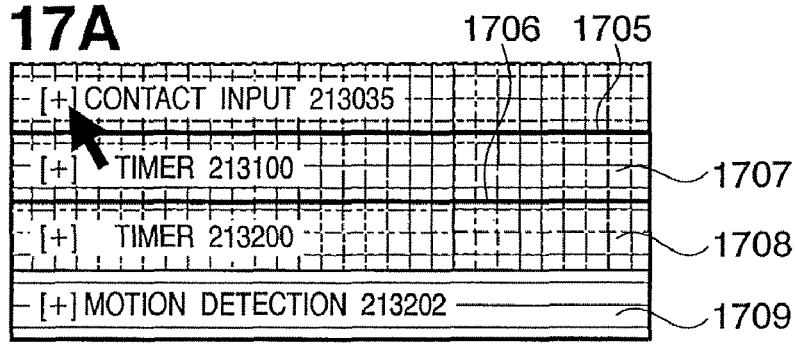
FIGS. 17A and 17B are diagrams for illustrating exemplary list displays according to the sixth embodiment of the present invention.
Figure 17B:
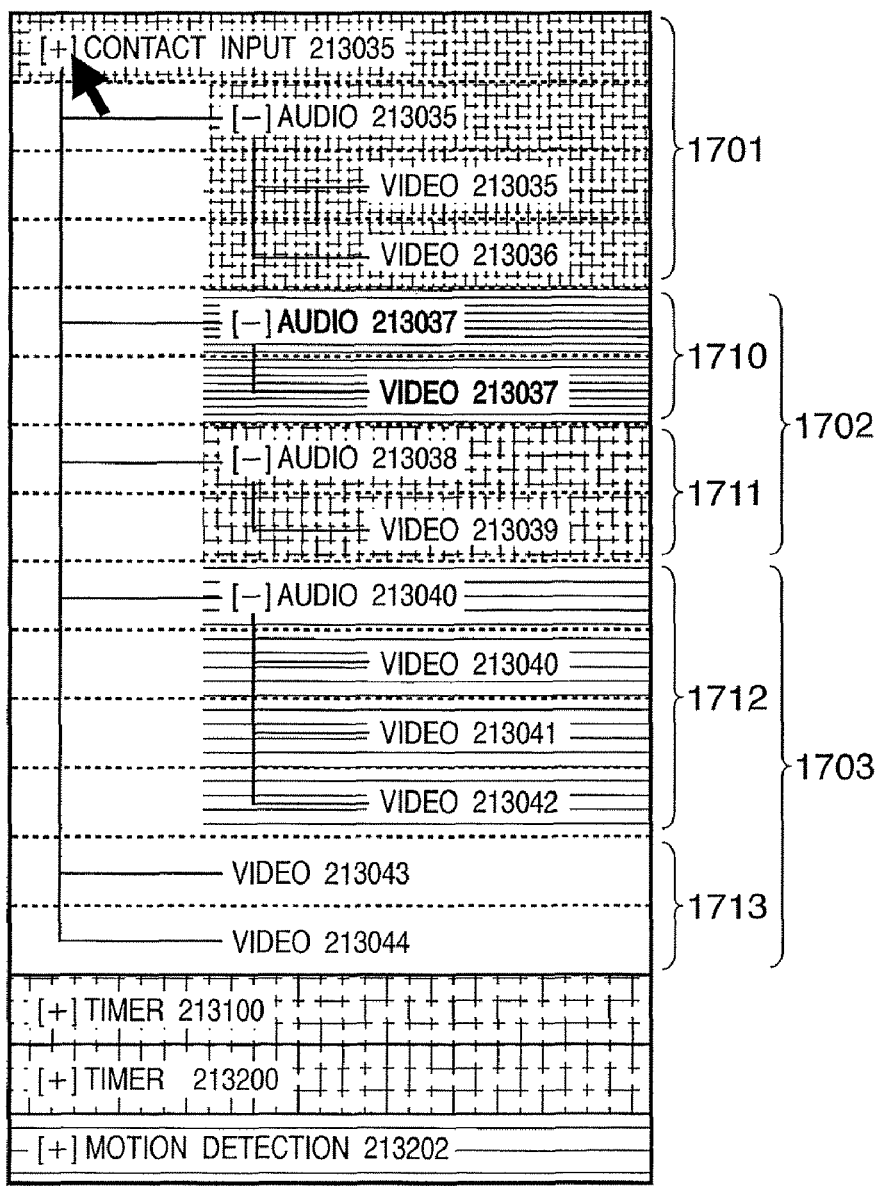

FIGS. 17A and 17B are diagrams for illustrating exemplary list displays according to the sixth embodiment of the present invention. Here, contact input fields 1707, 1708, 1701 and 1711 indicate a background color of yellow, and 1709, 1710 and 1712 indicate a background color of blue. For the highlight display, bold prints and deep-colored-background are used. Hereinafter, hour, minute and second are indicated by six digits in the form of hhmmss.

For a period of a range attribute of a contact input 213035 of the event information, i.e., from a start time of day of "213035" to an end time of day of "213044", audio information "213035" and items of video information "213035" and "213036" are grouped in one (1701). Audio information "213037" and items of nvideo information from "213037" to "213039" are classified into different groups (1702), and audio information "213040" and items of video information from "213040" to "213044" are classified in a group (1703).

Similarly, a period of a range attribute of a timer "213100" of event information is from a start time of day of "213100" to an end time of day of "213130". A period of a range attribute of a timer "213200" of event information is from a start time of day of "213200" to an end time of day of "213230". If a period of a range attribute of motion detection "213202" of event information is from a start time of day of "213202" to an end time of day of "2132312", they are grouped respectively.

Non-continuous display according to the sixth embodiment is not a blank line but a bold line between lines. A contact input of event information "213035" is displayed "with background color, yellow". Then, a bold line 1705 representing non-continuity is displayed, and a timer of event information "213100" 1707 is displayed "with background color, yellow". Then, a bold line 1706 representing non-continuity is displayed, and a timer of event information "213200" 1708 is represented "with background color, yellow". Finally, motion detection of event information "213202" 1709 is displayed "with background color, blue".

In the same processing as that at step S1511 of FIG. 15, a group of a contact input "213035" is expanded and displayed as denoted from 1701 to 1703. At this moment, the range from "213035" to "213044" is the range treated at the step equivalent to step S401 of FIG. 4. In this manner, the list keep program 160 is recursively called and also recursively expanded and displayed at the same step as the recursive step S1511 of the list display program 122. More specifically, it is processed as below.

If a start time of day is "213035" and an end time of day is "213037" in a period which is a range attribute of the audio information "213035", steps equivalent to step S1125 and S1113 are recursively executed. Accordingly, as there is only one overlap in the range (in audio and video), the display attribute of the audio information "213035" and the items of video information from "213035" to "213036" is "with background color, yellow, without highlight" (1701).

Next, if a start time of day is "213037" and an end time of day is "213039" in a period of a range attribute of audio information "213037", steps equivalent to step S1123 and step S1114 are recursively executed. As there are two or more overlaps in the range (in audio and video), the display attribute of the audio information "213037" and the video information "213037" is "with background color, blue, with highlight" (1710). Then, if a start time of day is "213038" and an end time of day is "213038" in a period of a range attribute of video information "213038", a step equivalent to step S1115 is recursively executed. As there is only one overlap outside the range (in audio and video), the display attribute of the items of video information from "213038" to "213039" is "with background color, yellow, without highlight" (1711).

If a start time of day is "213040" and an end time of day is "213042" in a period which is a range attribute of audio information "213040", steps equivalent to step S1124 and step S1113 are recursively called. As it is outside the range (in audio and video) but there is a continuous overlap, the display attribute of the audio information "213040" and the items of video information from "213040" to "213042" is displayed "with background color, blue, without highlight" (1712).

Then, if a start time of day is "213043" and an end time of day is "213043" in a period which is a range attribute of video information "213043", it is outside the range (in audio and video) without synchronous/coordination relationship at a step equivalent to the recursively called step S1112. Accordingly, the display attribute of the items of video information from "213043" to "213044" is "without background color" (1713).

An attribute can be represented as a bundled display adopted as in FIGS. 17A and 17B. The display itself is treated similar to a multistage folder structure, like a file display in a bundled structure.

According to the sixth embodiment, the feature of a list display of three or more kinds of stored information can be improved as correlated groups are treated. It can be grouped by the unit with correlation to specify synchronization/multiplication/the degree of multiplication in multistage.

[Seventh Embodiment]

In the first embodiment, it shows that synchronization/coordination of a group which can be subject to synchronization/coordination are specified as shown in FIG. 7 and FIG. 10. The seventh embodiment is for improving convenience of user operation by batch processing on a group with the synchronization/coordination specified in response to simple operation. A configuration of the system according to the seventh embodiment is the same as that of the information gathering system of the first embodiment, with only difference being that the synchronous playback program 150 is modified and background meta information is added.

Figure 19:
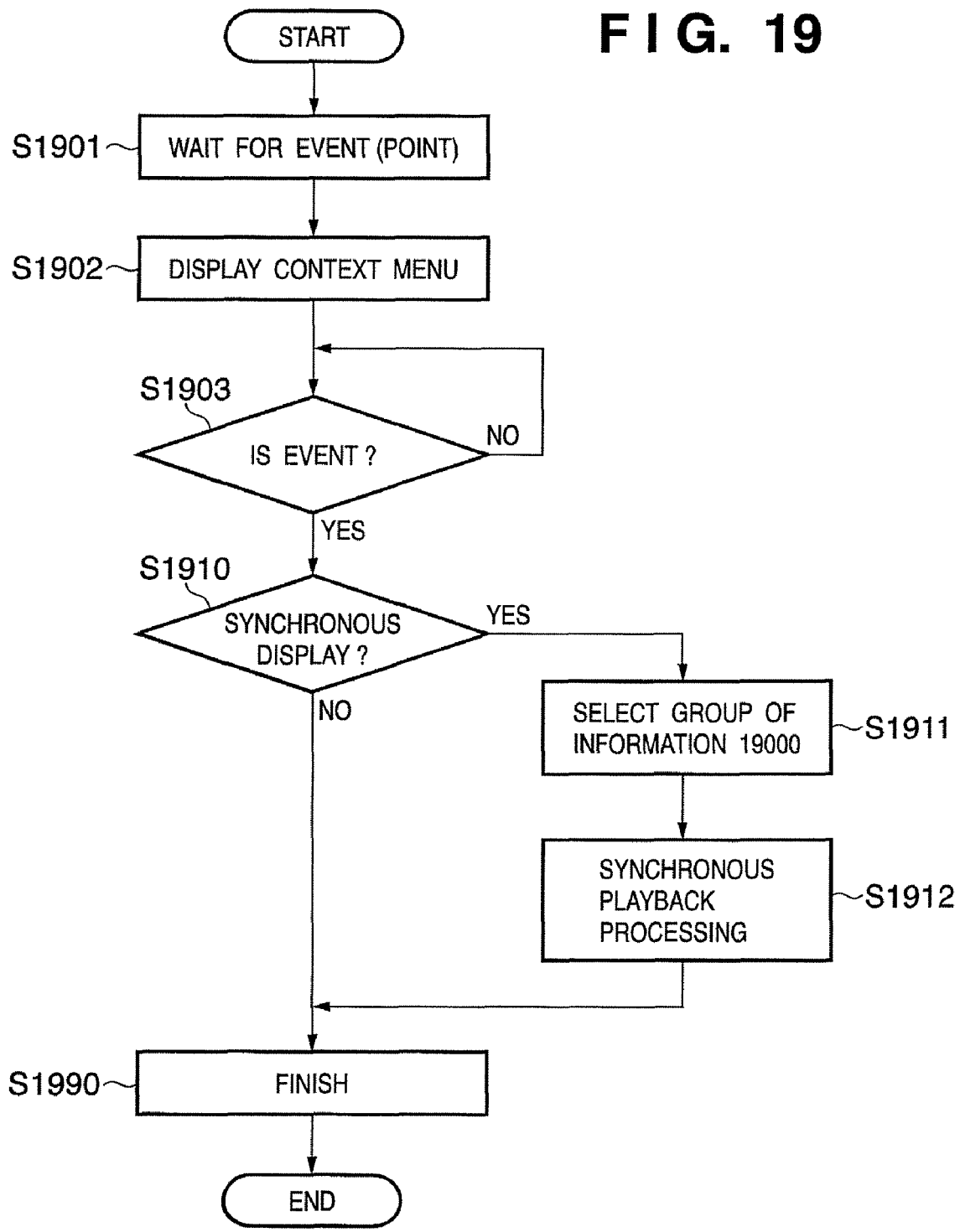
FIG. 19 is a flowchart for illustrating process of a synchronous playback program according to the seventh embodiment.

FIG. 19 is a flowchart for illustrating operation of a synchronous playback program according to the seventh embodiment.

When occurrence of an event by pointed by mouse point or the like is waited for and an event occurs by right click on a mouse 106 at step S1901, the process proceeds to step S1902. At step S1902, a context menu is displayed. In the seventh embodiment, "synchronous display" is displayed as an item of the menu. At step S1903, occurrence of an event such as menu selection is waited for. When a synchronous display item is selected at step S1910, the process proceeds to step S1911, and designated information, here a group of information 19000 having the same background color as that of the video information "041116213038" of FIG. 20, for example, is selected.

FIG. 20 is a diagram showing an exemplary list display according to the ninth embodiment.

Although the same processing as that for visually determining a group on actual video memory may be executed for the determination, relationship between a background attribute and noticed information may be kept on the memory 101 as background meta information 191 as shown in FIG. 21, while noticed information is displayed by the list display program 120 or the like, and a range of the same background color may be caused to be determined from the information before and after, generally as in the conventional art. That can be realized by conventional systems.

FIG. 21 is a diagram for illustrating the background meta-information 191 according to the seventh embodiment.

Next, at step S1912, synchronous playback is executed when processing equivalent to the synchronous playback program 150 of the first embodiment is executed. Then at step S1990, the synchronous playback program is ended.

As another embodiment, at step S1902, the process may proceed to step S1911 as it is in response to one-click without displaying a context menu, and the synchronous playback is executed at step S1912 and processing may be terminated at step S1990 in a similar manner. Accordingly, collected information independently collected is listed, while correlation of synchronization of video information and audio information may be previously specified for information which is selected from the collected information and is subject to synchronous playback, facilitating desired information to be selected. A group of information 19000 which can be grouped by simple operation such as one-click can be selected. In this manner, synchronous playback of plural items can be simply executed.

[Eighth Embodiment]

The eighth embodiment shows an example where convenience in user operation is improved by batch processing with a simple action even if multiplicity/the degree of multiplicity are specified.

An example of operation of a synchronous playback program of the eighth embodiment will be described. For example, in FIG. 22 similar to FIG. 12, when the video information "041116213038" is selected, a context menu is displayed. As an item of the menu, "synchronous display" is displayed. When the item of "synchronous display" is selected, a candidate menu 23000 of the group of information 19000 (FIG. 21) to be selected as shown in FIG. 23 is displayed. When an item is selected, synchronous playback is executed at the step equivalent to step S1912.

For example, when step S1501 of processing of the list display program 122 of FIG. 15 in the fifth embodiment is initialized, display meta information 192 for each item of information is kept as FIG. 24. Specifically, a file name, a range attribute, a display attribute and the like are kept in the order of display. In displaying the candidate menu 23000 of FIG. 23, an overlapped range can be determined with the display meta information 192 in which information determining a group is kept.

In the eighth embodiment, when the video information "041116213038" is designated, the overlapped range is from a start time of day of "041116213035" to an end time of day of "041116213039" of a period of a range attribute of the audio information "041116213035". The overlapped range is from a start time of day of "041116213038" to an end time of day of "041116213040" of a period of a range attribute of the audio information "041116213038". Here, these items of audio information are displayed in a candidate menu 23000 as information with multiplication. If multiplicity/the degree of multiplicity are present before and after like this, i.e., in the display meta information 192, the information before and after is searched. For each overlapped item of information, a candidate menu 23000 as shown in FIG. 23 is displayed at the same step as step S1911. At this moment, if there are neither multiplicity nor the degree of multiplicity, i.e., if there is only one candidate for a group of information to be selected, the process may proceed to step S1912 (FIG. 19) and execute synchronous playback without displaying the candidate menu 23000 as shown in FIG. 23, like the seventh embodiment.

After executing synchronization and playback at the step equivalent to step S1912, the tenth synchronous playback program is terminated at the step equivalent to step S1990. At this moment, the process may return to the step equivalent to step S1901, and keep waiting for an event. In this manner, collected information independently gathered is listed, while correlation of synchronization of video information and audio information may be previously specified for information which is selected from the collected information and is subject to synchronous playback. Further, if both multiplicity/the degree of multiplicity are specified, preferred information can be easily selected on a candidate menu and a group of information 19000 which can be grouped can be selected by simple operation so that synchronous playback may be facilitated.

[Ninth Embodiment]

In the eighth embodiment, an example where a group which can be subject to synchronization/coordination is specified including multiplication/the degree of multiplication so that synchronous playback is facilitated is shown. In the ninth embodiment, a group of information relevant to information selected at a list display is displayed in thumbnails so that convenience in user operation can be improved. The other configurations are the same as those of the above-mentioned embodiments.

Figure 25:
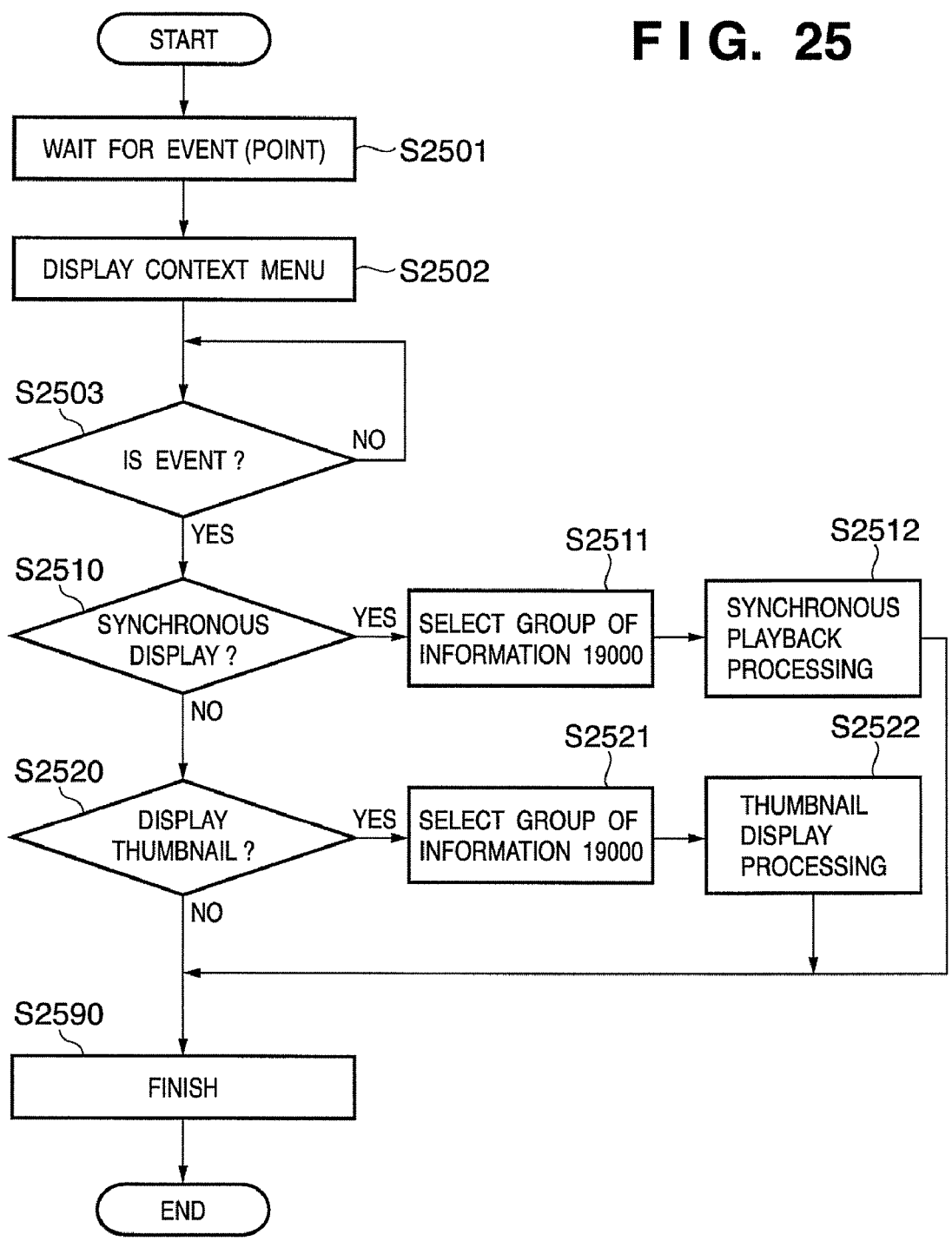
FIG. 25 is a flowchart for illustrating process of the synchronous playback program according to the ninth embodiment.

FIG. 25 is a flowchart for illustrating operation of the synchronous playback program according to the ninth embodiment.

As step S2501 to step S2503 and step S2510 to step S2512 are equivalent to the processing of step S1901 to step S1903 and step S1910 to step S1912 of the synchronous playback program shown in FIG. 19 of the seventh and eighth embodiments, description of them will be omitted.

When a thumbnail display menu is selected at step S2520, the process proceeds to step S2521, and pointed information, here the video information "041116213038" as in FIG. 22 of the eighth embodiment, for example, is selected. The selected group of candidate information 19000 is selected and displayed in thumbnails at step S2522. At this moment, similar to the seventh embodiment, if there is no multiplicity, it is directly displayed in thumbnails without displaying the candidate menu 23000. The context menu is not displayed at step S2502, and thumbnails can be displayed in the same processing as in step S2522. That is to say, it can improve operability for a user (feature of listing) by defaulting to a state with a thumbnail display.

When there is multiplicity/the degree of multiplicity at step S2521, a candidate menu is displayed as in the eighth embodiment, and the thumbnail images of the selected group of information 19000 are displayed.

Figure 26:
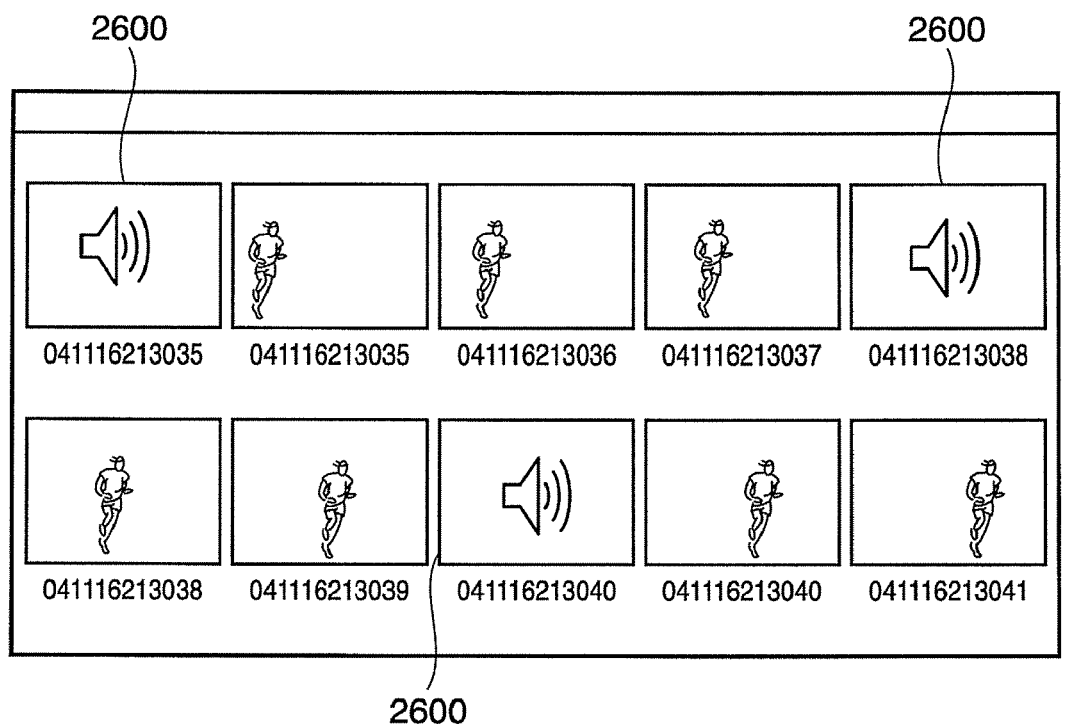
FIG. 26 is a diagram showing an exemplary thumbnail display according to the ninth embodiment.

FIG. 26 depicts a view for illustrating an exemplary thumbnail display according to the ninth embodiment.

In FIG. 26, the reference numeral 2600 denotes an icon of audio information, and the other dereference numerals denote icons of video information. The numbers described under respective icons denote a time of day when information relevant to the icon occurred (see FIG. 24).

When thumbnails are displayed, audio information may be included in the thumbnail display as an icon.

When the thumbnails are displayed at step S2522, a synchronous playback program 153 is terminated at step S2590. Then the process may return to step S2501 and may keep waiting for an event.

In this manner, collected information independently gathered is listed, while correlation of synchronization of video information and audio information may be specified for information which is selected from the collected information and is subject to synchronous playback. Further, even if multiplicity/the degree of multiplicity are specified, it can provide for a user with a thumbnail display as a group display in which preferred information is easily selected on a candidate menu with a good feature of listing.

[Other Embodiments]

The present invention may be applied to a system consisting of a plurality of appliances (for example, a host computer, an interface appliance, a reader, a printer and the like) or a device consisting of a single appliance (for example, a printer, a facsimile machine or the like).

The object of the present invention can also be achieved when a storage medium storing a program code of software which realizes functions of the above-mentioned embodiments is mounted on a system or a device and the program code installed from the storage medium is read out and executed. In such a case, the program code read out from the storage medium realizes functions of the above-mentioned embodiments. Therefore, the storage medium storing the program code forms the present invention. When the program code read out by a computer is executed, the functions of the above-mentioned embodiments are realized. The case where an operating system (OS) or the like operating on a computer executes a part or all of actual processing based on the instructions from the program code and functions of the above-mentioned embodiments are realized by the processing, is also included.

Further, functions of the embodiment may be realized when a program code read out from the storage medium is written in memory provided for a function expanding card inserted into a computer or a function expanding unit connected with a computer, and a CPU of a main unit executes a part or all of processing.

A storage medium for supplying a program includes a floppy (registered trademark) disk, a hard disk, an optical disk, a magnetic optical disk, MO, CD-ROM, CD-R, CD-RW, a magnetic tape, a non-volatile memory card and the like. Further, ROM, DVD (DVD-ROM, DVD-R) are also included.

Alternatively, it may connect with a home page on the Internet via a browser of a client computer, and download the computer program of the present invention or a file of the compressed computer program including an automatic installing function from the home page. It can also be realized when the program code forming the program of the present invention is divided into a plurality of files and respective files are downloaded from different home pages. That is to say, the WWW server for each of a plurality of users to download the program file for realizing functional processing of the present invention in a computer is also included in the claim of the present invention.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Application No. 2005-206131 filed on Jul. 14, 2005, which is hereby incorporated by reference herein entirety.

What is claimed is:

1. An information processing apparatus comprising:
an acquiring unit configured to acquire attribute information of image data existing in a storage unit and attribute information of audio data existing in the storage unit, the attribute information of the image data has a value and the attribute information of the audio data has a range; and
a control unit configured to determine whether or not the value of the attribute information of the image data is within the range of the attribute information of the audio data and to distinguishably display, on a display unit, identification of first image data of which the value of the attribute information is within the range of the attribute information of the audio data and identification of second image data of which the value of the attribute information is not within the range of the attribute information of the audio data such that the identification of the first image data is displayed in a first manner and the identification of the second image data is displayed in a second manner being distinguishable from the first manner.

2. The information processing apparatus according to claim 1, wherein the control unit plays back the image data and audio data synchronized with each other in accordance with a user's designation on the display unit.

3. The information processing apparatus according to claim 1, wherein the storage unit further stores time information on which the image data or audio data stored in the storage unit was captured,
wherein the control unit displays the identifications of the image data based on the time information stored in the storage unit.

4. The information processing apparatus according to claim 3, wherein the control unit sorts and displays items of the image data and audio data stored by the storage unit according to the time information.

5. The information processing apparatus according to claim 1, wherein the attribute information of the audio data has first and second ranges, and the control unit displays the identification of the image data and the first and second ranges of the attribute information of the audio data such that the attribute information of the image data and the second range of the attribute information of the audio data do not continue can be discriminated.

6. The information processing apparatus according to claim 1, wherein the control unit displays the identifications with a background color such that the identifications of the image data of which the value of the attribute information is within or is not within the range of the attribute information of the audio data.

7. The apparatus according to claim 6, wherein the control unit displays the identification of the image data of which the value of the attribute information is not within the range with non color background.

8. The apparatus according to claim 1, wherein the control unit displays the identification of the image data and the identification of the audio data on the display unit such that the identification of the image data of which the value of the attribute information is within the range of the attribute information of the audio data and the identification of the image data of which the value of the attribute information is not within the range of the attribute information of the audio data are displayed distinguishably.

9. The apparatus according to claim 1, wherein the control unit displays the identification of the image data and the identification of the audio data on the display unit such that the identification of the image data and the identification of audio data are displayed in an order based on the value of the attribute information of the image data and a value for defining the range of the attribute information of the audio data and such that the identification of the image data of which the value of the attribute information is within the range of the attribute information of the audio data and the identification of the image data of which the value of the attribute information is not within the range of the attribute information of the audio data are displayed distinguishably.

10. The apparatus according to claim 1, wherein the control unit comprises a selection unit configured to select the identification of the image data, and the control unit reproduces the image data selected by the selection unit.

11. An information processing method comprising: the following steps are implemented by a processor with a memory;
   an acquiring step of acquiring attribute information of image data existing in a storage unit and attribute information of audio data existing in the storage unit, the attribute information of the image data has a value and the attribute information of the audio data has a range;
   a determining step of determining whether or not the value of the attribute information of the image data is within the range of the attribute information of the audio data; and
   a display step of distinguishably displaying, on a display unit, identification of first image data of which the value of the attribute information is within the range of the attribute information of the audio data and identification of second image data of which the value of the attribute information is not within the range of the attribute information of the audio data such that the identification of the first image data is displayed in a first manner and the identification of the second image data is displayed in a second manner being distinguishable from the first manner.

12. The information processing method according to claim 11, further comprising a playback step of playing back the image data and audio data synchronized with each other in accordance with a user's designation on the display unit.

13. The information processing method according to claim 11, wherein the storage unit further stores time information on which the image data or audio data stored in the storage unit was captured,
   wherein the display step displays the identifications of the image data-based on the time information stored in the storage unit.

14. The information processing method according to claim 13, wherein the display step sorts and displays items of the image data and audio data stored in the storage unit according to the time information.

15. The information processing method according to claim 11, wherein the attribute information of the audio data has first and second ranges, and the display step displays the identification of the image data and the first and second ranges of the attribute information of the audio data such that the attribute information of the image data and the second range of the attribute information of the audio data do not continue can be discriminated.

16. A program stored on a non-transitory computer readable medium, the program being accessed by a computer and causing the computer to execute the information processing method according to claim 11.

17. The information processing method according to claim 11, wherein the display step displays the identifications with a background color such that the identifications of the image data of which the value of the attribute information is within or is not within the range of the attribute information of the audio data.

18. The method according to claim 17, wherein the display step displays the identification of the image data of which the value of the attribute information is not within the range with non color background.

19. The method according to claim 11, wherein the control step displays the identification of the image data and the identification of the audio data on the display unit such that the identification of the image data of which the value of the attribute information is within the range of the attribute information of the audio data and the identification of the image data of which the value of the attribute information is not within the range of the attribute information of the audio data are displayed distinguishably.

20. The method according to claim 11, wherein the control step displays the identification of the image data and the identification of the audio data on the display unit such that the identification of the image data and the identification of audio data are displayed in an order based on the value of the attribute information of the image data and a value for defining the range of the attribute information of the audio data and such that the identification of the image data of which the value of the attribute information is within the range of the attribute information of the audio data and the identification of the image data of which the value of the attribute information is not within the range of the attribute information of the audio data are displayed distinguishably.

21. The method according to claim 11, wherein the control step comprises a selection step of selecting the identification of the image data, and the control step reproduces the image data selected in the selection step.

22. An information processing system, comprising;
   an acquiring unit configured to acquire attribute information of image data existing in a storage unit and attribute information of audio data existing in the storage unit, the attribute information of the image data has a value and the attribute information of the audio data has a range; and
   a control unit configured to determine whether or not the value of the attribute information of the image data is within the range of the attribute information of the audio data and to distinguishably display, on a display unit, identification of first image data of which the value of the attribute information is within the range of the attribute information of the audio data and identification of second image data of which the value of the attribute information is not within the range of the attribute information of the audio data such that the identification of the first image data is displayed in a first manner and the identification of the second image data is displayed in a second manner being distinguishable from the first manner.

* * * * *